(12) United States Patent
Liu et al.

(10) Patent No.: US 11,988,252 B2
(45) Date of Patent: May 21, 2024

(54) SPLIT-TYPE SWING ANGLE ADJUSTABLE AEROSTATIC BEARING DEVICE FOR ROTOR STATIC BALANCE, AND AIR FLOTATION SUPPORT DEVICE FOR STATIC BALANCE OF ROTATING RING-SHAPED PARTS

(71) Applicant: HARBIN INSTITUTE OF TECHNOLOGY, Harbin (CN)

(72) Inventors: Zhansheng Liu, Harbin (CN); Shubo Yu, Harbin (CN); Yuanli Sun, Harbin (CN); Guanghui Zhang, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 386 days.

(21) Appl. No.: 17/519,632

(22) Filed: Nov. 5, 2021

(65) Prior Publication Data

US 2022/0056954 A1 Feb. 24, 2022

Related U.S. Application Data

(63) Continuation of application No. PCT/CN2020/088949, filed on May 7, 2020.

(30) Foreign Application Priority Data

May 7, 2019 (CN) .......................... 201910376022.0

(51) Int. Cl.
*G01M 1/04* (2006.01)
*F16C 32/06* (2006.01)
*G01M 1/12* (2006.01)

(52) U.S. Cl.
CPC ...... *F16C 32/0603* (2013.01); *F16C 32/0666* (2013.01); *G01M 1/04* (2013.01); *G01M 1/12* (2013.01)

(58) Field of Classification Search
CPC ............ G01M 1/02; G01M 1/04; G01M 1/14; G01M 13/04
(Continued)

(56) References Cited

U.S. PATENT DOCUMENTS

| 1,392,028 A | * | 9/1927 | Torbet | G01M 1/04 73/476 |
| 2,946,224 A | * | 7/1960 | Yamaguchi | G01M 1/04 73/461 |

(Continued)

FOREIGN PATENT DOCUMENTS

| CN | 201013753 | 1/2008 |
| CN | 101839791 A | * 9/2010 |

(Continued)

OTHER PUBLICATIONS

International Search Report issued in corresponding International application No. PCT/CN2020/088949, dated Aug. 6, 2020.

(Continued)

*Primary Examiner* — David A. Rogers
(74) *Attorney, Agent, or Firm* — Nitin Kaushik

(57) ABSTRACT

The present disclosure provides a split-type swing angle adjustable aerostatic bearing device for rotor static balance and an air flotation support device for static balance of rotating ring-shaped parts, the split-type swing angle adjustable aerostatic bearing device for rotor static balance and an air flotation support device for static balance of rotating ring-shaped parts belong to a field of static balance detection, and aims to solve a problem of low measurement precision of rotor and realize static balance of rotating ring-shaped parts. A gas mold, having a certain bearing capacity, is formed between an outer surface of the air flotation support cover under the bearing base and a concave surface of the upper base, so that the bearing base is floated (Continued)

to realize an automatic centering of the rotor static balancing device.

20 Claims, 26 Drawing Sheets

(58) Field of Classification Search
USPC .............................................. 73/66, 455–487
See application file for complete search history.

(56) References Cited

U.S. PATENT DOCUMENTS

| | | | |
|---|---|---|---|
| 3,695,114 A * | 10/1972 | Smith | G01M 1/04 |
| | | | 73/485 |
| 10,794,790 B2 * | 10/2020 | Liu | G06N 3/04 |
| 11,480,490 B2 * | 10/2022 | Sun | G01M 1/125 |
| 2009/0034887 A1 | 2/2009 | Fujikawa et al. | |
| 2017/0044928 A1 * | 2/2017 | Tan | G01B 21/00 |
| 2017/0175584 A1 * | 6/2017 | Tan | F01D 25/285 |
| 2020/0217737 A1 * | 7/2020 | Sun | G06N 3/084 |
| 2020/0217739 A1 * | 7/2020 | Liu | G06F 17/16 |

FOREIGN PATENT DOCUMENTS

| | | | | |
|---|---|---|---|---|
| CN | 103230818 A | | 8/2013 | |
| CN | 103233978 A | | 8/2013 | |
| CN | 103439051 A | | 12/2013 | |
| CN | 103775497 A | | 5/2014 | |
| CN | 203711112 U | | 7/2014 | |
| CN | 204694402 U | * | 10/2015 | |
| CN | 105910759 A | * | 8/2016 | |
| CN | 106769029 A | * | 5/2017 | |
| CN | 105571783 B | * | 1/2018 | |
| CN | 105865791 B | * | 3/2019 | ............ G01M 13/04 |
| CN | 109482699 A | * | 3/2019 | ............ B21D 22/06 |
| CN | 110094424 A | | 8/2019 | |
| DE | 112022000012 T5 | * | 8/2023 | .......... F16C 32/0622 |
| RU | 2217719 C1 | * | 11/2003 | |

OTHER PUBLICATIONS

Written Opinion of the International Searching Authority for No. PCT/CN2020/088949.

* cited by examiner

C-C

B-B

D-D

SPLIT-TYPE SWING ANGLE ADJUSTABLE AEROSTATIC BEARING DEVICE FOR ROTOR STATIC BALANCE, AND AIR FLOTATION SUPPORT DEVICE FOR STATIC BALANCE OF ROTATING RING-SHAPED PARTS

CROSS REFERENCE TO RELATED APPLICATIONS

This application is a continuation-application of International (PCT) Patent Application No. PCT/CN2020/088949, filed on May 7, 2020, which claims foreign priorities of Chinese Patent Applicant No. 201910376022.0, filed on May 7, 2019, the entire contents of which are incorporated herein by reference.

TECHNICAL FIELD

The present disclosure relates to a bearing device and an aerostatic supporting device for rotating ring-shaped parts, in particular to a split-type swing angle adjustable aerostatic bearing device for rotor static balance and an air flotation support device for rotating ring-shaped parts. The present disclosure relates to a static balance field of rotors or rotating ring-shaped parts, a static balance detection field of rotors or rotating ring-shaped parts, and a technical field of aerostatic bearing or air flotation supporting.

BACKGROUND

In a process of manufacturing and mounting rotor components of a rotary machine, a rotor generates unbalanced mass due to uneven materials, machining errors, assembly errors, etc. During rotation of the rotor, the unbalanced mass causes the rotary machine to generate vibration noise, which seriously affects safety and reliability of the rotary machine. Therefore, the rotor components of the rotary machine need to be subjected to static balance, and current rotor static balance detection devices usually adopt rotor static balance devices. Two vertically adjustable sliding plates are disposed in current rotor static balancing devices, and two rolling bearings having a certain gap between is disposed on each of the sliding plates. The rotor is placed on the two rolling bearings of each of the sliding plates, and the two rolling bearings are disposed at two ends of the rotor for axial positioning. This method of static balance has following defects: frictional resistance is large and long-term use causes ball abrasion, resulting in a decrease in measurement accuracy. Aerostatic lubricating bearings have a series of advantages such as small friction loss, high movement precision, small vibration, no pollution, etc. In recent years, the aerostatic lubricating bearings have been widely used in machine tool industry, high-speed and precision machinery industry, electronics industry, and medical equipment industry, etc. At present, most of the aerostatic bearings are integrally manufactured and cannot be applied to current rotor static balancing devices. A main reason is that the rotor needs to be disposed in a floating form during a static balancing process. The rotor tilts during rotation and cause collision and friction on the bearings, which cannot meet needs of the motor static balance.

At present, the motor static balance mainly adopts two methods: a guide rail type and a swing frame type. A guide rail type rotor static balance device is mainly composed of two high-precision parallel guide rails and a fixed bracket, whose working principle is that the rotor is placed on the guide rails, a gravity center of the rotor is naturally downward driving by gravity, the gravity is repeatedly reduced by rotating the rotor, and finally the rotor static balance is reached. A swing frame type rotor static balance device is composed of two swing frames, each of the swing frames includes sliding plates, rollers, axial positioners, etc., and a working principle of the swing frame type rotor static balance device is similar to that of the guide rail type rotor static balance device. The current rotor static balance devices have defects of large volume weight, poor portability, low balance precision, etc. Therefore, a rotor static balance device, having wide application ranges and convenience and high precision, is needed.

There are few researches on static balance of rotating ring-shaped parts (hollow parts) in the prior art.

SUMMARY

The present disclosure aims to solve a problem that existing device of the rotor static balance adopts rolling bearings as support, due to relatively large frictional resistance, long-term use may cause ball abrasion and lead to decrease of measurement accuracy of a rotor. However, most of existing aerostatic bearings are integrally manufactured and cannot be applied to the existing devices for the rotor static balance. Therefore, the present disclosure provides a split-type swing angle adjustable aerostatic bearing device for rotor static balance.

In order to solve problems of large volume and weight, poor portability, and low static balance accuracy of the existing devices for rotor static balancing, the present disclosure further provides two other split-type swing angle adjustable aerostatic bearing devices for the rotor static balance. The two aerostatic bearing devices are portable high-precision devices for the rotor static balance.

In order to realize static balance of rotating ring-shaped parts, the present disclosure further provides an air flotation support device of rotating ring-shaped parts.

The technical solutions adopted by the present disclosure to solve the above technical problems are as follows:

The present disclosure provides a split-type swing angle adjustable aerostatic bearing device for rotor static balance, including a shaft base, an upper support base, a lower support base, a bottom base and an air inlet channel. The shaft base is disposed with a concave first semi-cylindrical surface, the first semi-cylindrical surface is disposed upward, a plurality of air holes are disposed on the first semi-cylindrical surface, the shaft base is fixed on the upper support base, a sealed air cavity is disposed between the shaft base and the upper support base, the plurality of air holes communicate with the sealed air cavity, the sealed air cavity is connected with an external air supply device through the air inlet channel, the upper support base and the lower support base are hinged to drive an axis of the first semi-cylindrical surface to swing by a certain angle in a vertical direction, and the lower support base and the bottom base are connected together.

The present disclosure further provides a split-type swing angle adjustable aerostatic bearing device for rotor static balance, including a bearing, a bearing base, a sealed working air cavity, an upper base, a lower base, and pillars. A first semi-cylindrical working surface is disposed on the bearing, a plurality of micro air holes, having a certain depth, are disposed on the first semi-cylindrical working surface, a second semi-cylindrical surface is disposed on the bearing, the second semi-cylindrical surface is disposed with a plurality of small air holes of a certain depth, the plurality of micro air holes are connected with the plurality of small air holes, the bearing is fixed on the bearing base to form a sealed working air cavity between the bearing and the bearing base, the plurality of small air holes are connected to the sealed working air cavity, the sealed working air cavity is filled with medium-pressure gas through the air inlet channel, the bearing base and the upper base are in spherical contact with two pillars and may swing at a certain angle in a vertical direction, the upper base and the lower base are rotated by a certain angle along a circumferential direction of the upper base and the lower base through a rotating device.

The present disclosure provides further provides a split-type swing angle adjustable aerostatic bearing device for rotor static balance, including a bearing base, an air floatation support cover, an upper base, pillars, and a lower base. A sealed air cavity is disposed between the bearing base and a bearing disposed on the bearing base, the sealed air cavity is connected to an external air supply device through an air inlet channel on the bearing base, a plurality of air holes on the bearing is communicated with the sealed air cavity. A through hole communicated with the sealed air cavity is disposed on a bottom surface of the bearing base, the air flotation support cover is disposed under the bearing base, and an opening of the air flotation support cover is sealed to a bottom end surface of the bearing base, so that the air flotation support cover and the bearing base form a gas working air cavity. The sealed air cavity is communicated with the gas working air cavity through the through hole. A plurality of support cover air holes on the air flotation support cover is communicated with the gas working air cavity. A concave surface is disposed on the upper base, the concave surface matches an outer contour of the air flotation support cover, the concave surface is in clearance fit with an outer surface of the air flotation support cover, and the air flotation support cover is disposed in the concave surface. Under working conditions, after gas in the working air cavity penetrates through the plurality of the support cover air holes on the air flotation support cover, a gas mold, having a certain bearing capacity, is formed between the outer surface of the air flotation support cover and the concave surface to float the bearing base, and the bearing base freely swings to realize automatic centering of a rotor static balance device. The upper base is connected with the lower base through the pillars, and a distance between the upper base and the lower base is adjusted through the pillars to adjust an elevation of the bearing base.

The present disclosure further provides an air flotation support device for static balance of rotating ring-shaped parts, including an air floatation support structure, an axial sealing pressing plate, a radial sealing pressing plate, a connecting pillar, a base, and two axial positioning devices. The air flotation support structure is configured to support a rotating ring-shaped part whose size is less than or equal to the semi-cylindrical structure of the rotating ring-shaped part, an air inlet on one end wall is disposed on the air flotation support structure, the air inlet is communicated with the working air cavity in the air flotation support structure, a range of the angle between the two side walls along a circumferential direction on the working surface of the air flotation support structure is 30°~180°, namely that a range of the central angle corresponding to the arc on the cross section of the air flotation support structure is 30°~180°, a plurality of through holes communicated with the working air cavity are disposed on the curved side wall, the open end surface of the other end of the air flotation support structure is sealed and connected by the axial sealing pressing plate, the longitudinal section end of the air flotation support structure is in hermetically connected with the radial sealing pressing plate, and the radial sealing pressing plate is connected with the base through the connecting pillar. Axial positioning devices are respectively disposed on the two ends of the working surface of the air flotation support structure. In a working state, a gas penetrates through the air inlet to the working air cavity in the air flotation support structure, then penetrates through a plurality of through holes and enters the working surface of the air flotation support structure, and a gas mold, having a certain bearing capacity, is formed between the gas and a cylindrical surface of the rotating ring-shaped parts to be tested for static balance, so as to float the rotating ring-shaped parts to be tested for static balance.

The first three of the above four technical solutions are all configured for the static balance of the rotor or shaft, the fourth solution aims at the static balance of the rotating ring-shaped parts (hollow parts), such as gear sleeves or shaft sleeves, etc. The above four technical solutions have a same principle, and have many identical or corresponding specific technical features, thereby have uniformity of patents Compared with the prior art, the present disclosure has the following beneficial effects.

Technical solution 1: the shaft base of the present disclosure is a semi-cylindrical surface and is matched with the rotor, an external air pressure device is configured to inflate the air inlet channel to generate a positive pressure in the sealed air cavity, the air is blown into the contact surface of the rotor and the shaft base through a plurality of air holes so as to play a support role, a long rotor with the thick middle and fine middle ends further is supported, and the problem that the integral aerostatic bearings cannot pass through the long rotor is avoided. The hinged connection of the upper support base and the lower support base of the present disclosure enables the shaft base to swing at a certain angle, and prevents the shaft base from being worn when the rotor in the shaft base is tilted.

Technical solution 2: the bearing of the present disclosure is split and fits with the rotor gap, the rotor is convenient to place, the medium pressure gas is introduced into the working air cavity through the air inlet, the gas forms a gas mold with a certain bearing capacity on the working surface of the bearing through the air holes, the rotor is floated, and the rotor is statically balanced after the rotor is suspended. The device of the present disclosure is small in size, light in weight, and easy to carry. The present disclosure adopts the principle of air flotation to statically balance the rotor after it is floated, the balance accuracy is high. The bearing and the bearing base of the present disclosure rotate at a certain angle along the axial direction of the rotor, and swing at a certain angle along the rotor shaft, so that collision with the rotor is avoided, and the self-adaptive capacity is strong. The bearing of the present disclosure is disposed with a semi-cylindrical working surface, the working surface is in clearance fit with the rotor to be statically balanced, a plurality of micro air holes are disposed on the working surface, the bearing is fixed on the bearing base through the upper pressing plate and the side pressing plate, a sealed working air cavity is formed between the bearing and the bearing base, the plurality of micro air holes are connected with the sealed working air cavity, the bearing base and the upper base are connected by two pillars, the bearing base and the pillar are disposed as a spherical contact connection, the bearing base swings at a certain angle in a vertical direction, a rotating device is disposed between the upper base and the lower base, and the bearing base and the upper base rotate at a certain angle along a circumferential direction. The present disclosure is configured for high-precision rotor static balance occasions.

Technical solution 3: a gas mold, having a certain bearing capacity, is formed between the outer surface of the air flotation support cover below the bearing base and the concave surface of the upper base, so as to float the bearing base. The bearing base freely swings to realize the automatic centering of the rotor static balance device, and the structure is relatively simple. The present disclosure is configured for high-precision rotor static balance occasions.

Technical solution 4: a gas mold, having a certain bearing capacity, is formed between the working surface of the air flotation support structure and the cylindrical surface of the rotating ring-shaped parts to be tested for static balance, so as to float the rotating ring-shaped parts to be tested for static balance. The thrust working surface of the axial positioning device and the rotating ring-shaped parts to be tested for static balance form a gas mold with a certain bearing capacity along the axial end surface, so as to play the role of axial positioning. The technical solution 4 has simple structure and is configured for static balance of rotating ring-shaped parts.

There is gas contact between the rotor and the bearing, which friction coefficient is small, and therefore the static balance precision of the rotor is high.

BRIEF DESCRIPTION OF DRAWINGS

The reference sign of each of the technical solutions is independent.

DETAILED DESCRIPTION

Figure 1:
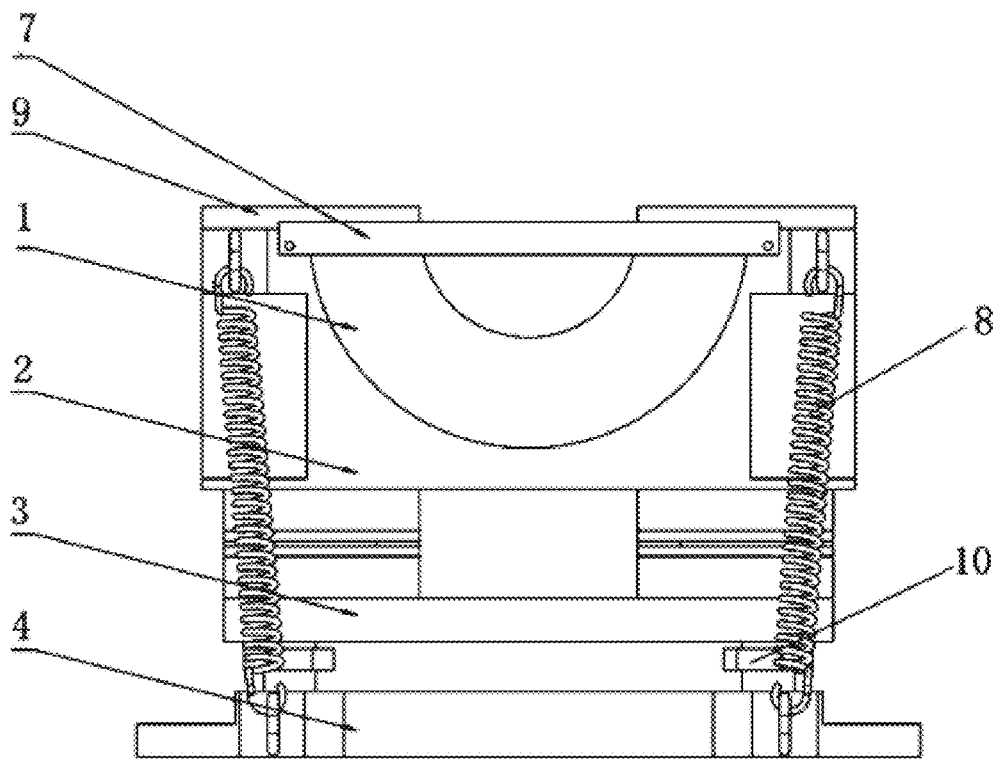
FIG. 1 is a schematic diagram of a first technical solution of the present disclosure.

Embodiments and working principle of the first technical solution are shown in FIG. 1-10:

Embodiment 1: the embodiment 1 is described with reference to FIGS. 1-4, and FIG. 10. The implementation manner 1 includes a shaft base 1, an upper support base 2, a lower support base 3, a bottom base 4, and an air inlet channel 5. A concave first semi-cylindrical surface is formed on the shaft base 1, the first semi-cylindrical surface faces upward, and a plurality of air holes 1-1 are disposed on the first semi-cylindrical surface. The shaft base 1 is fixed on the upper support base 2, and a sealed air cavity 6 is disposed between the shaft base 1 and the upper support base 2. The air holes 1-1 communicate with the sealed air cavity 6, and the sealed air cavity 6 is connected with an external air supply device through the air inlet channel 5. The upper support base 2 and the lower support base 3 are hinged for enabling an axis of the semi-cylindrical surface to swing by a certain angle in a vertical direction, and the support 3 and the base 4 are connected together. When in use, the rotor to be supported is disposed in the shaft base 1 and is inflated from the air inlet channel 5 by means of an external aerostatic device, so that the sealed air cavity 6 generates a positive pressure, and the gas is blown into the contact surface of the rotor and the shaft base 1 through the plurality of air holes 1-1 to form a thin gas mold so as to play a supporting role.

Figure 2:
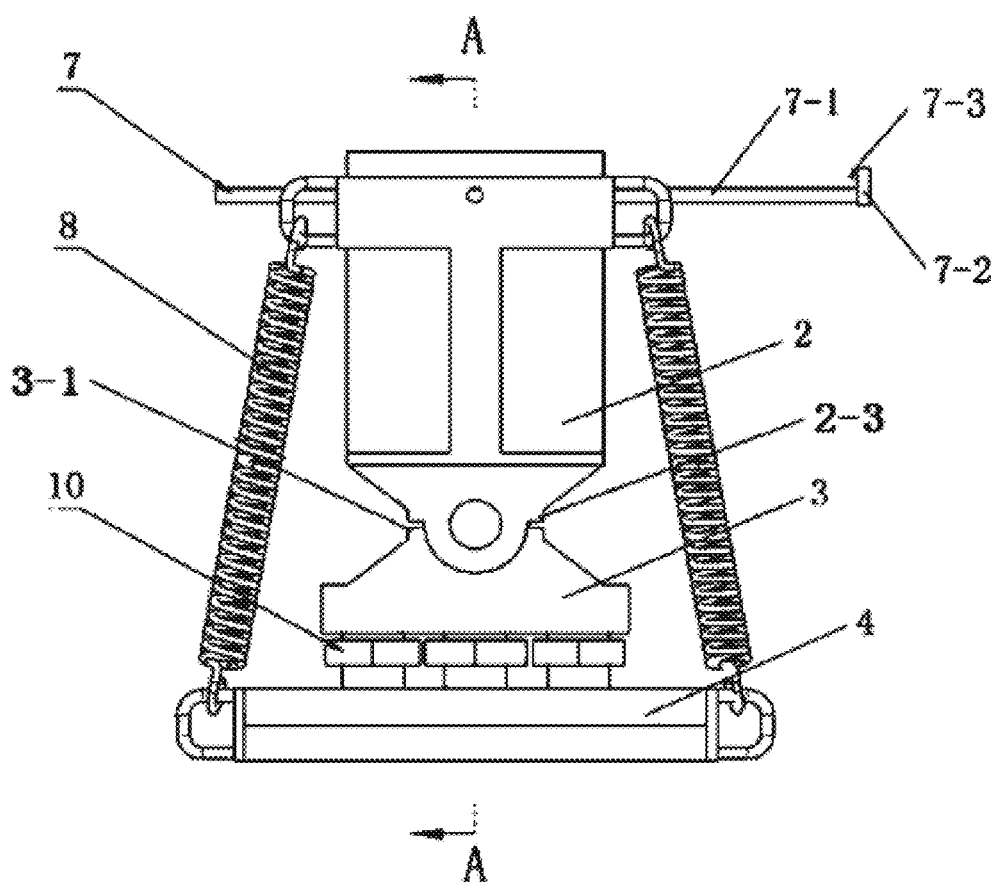
FIG. 2 is a side schematic diagram of FIG. 1.
Figure 3:
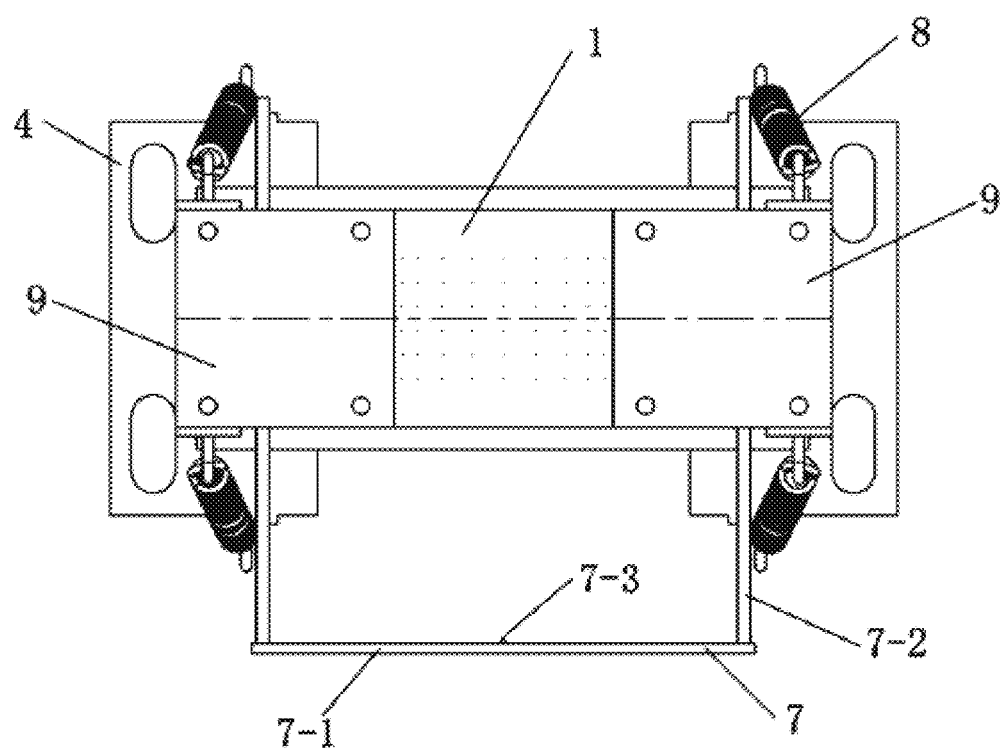
FIG. 3 is a top schematic diagram of FIG. 1.

Embodiment 2: the embodiment 2 is described with reference to FIG. 2 and FIG. 3, the implementation manner 2 further includes an axial positioning device 7, and the axial positioning device includes a baffle plate 7-1, two guide rods 7-2, and an axial limiting shaft 7-3. The two guide rods 7-2 are slidably disposed on the shaft base 1, the baffle plate 7-1 is fixed on the two guide rods 7-2, a bearing hole is disposed on a side, facing the shaft base 1, of the baffle plate 7-1, the axial limiting shaft 7-3 is disposed in the bearing hole, and a conical surface is formed on the axial limiting shaft 7-3. An axis of the conical surface on the axial limiting shaft 7-3, the axis of the first semi-cylindrical surface of the shaft base 1, and axes of the two guide rods 7-2 are parallel to each other. The conical surface on the axial limiting shaft 7-3 is concentric with the first semi-cylindrical surface on the shaft base 1, two threaded holes are disposed on the shaft base 1, a top wire is disposed in each of the threaded holes, and the top wire is abutted on a respective one of the two guide rods 7-2.

The rotor to be supported is positioned axially, two guide rods 7-2 are disposed, the position of the axial limiting shaft 7-3 is adjusted according to the distance between the supported position and the end of the rotor to play the role of axis positioning, and then each of the guide rods 7-2 is fixed by the top wire.

The other composition and connection relationship are the same as the embodiment 1.

Figure 4:
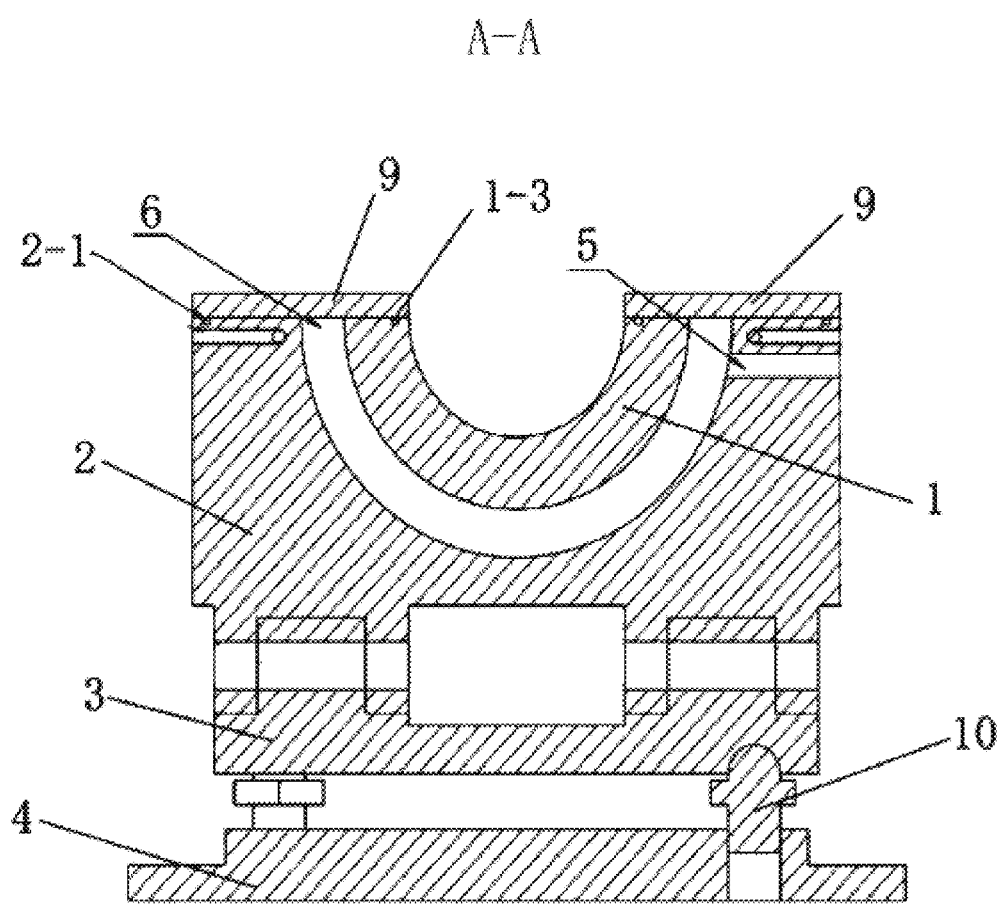
FIG. 4 is a cross-sectional schematic diagram taken along line A-A of FIG. 2.

Embodiment 3: the embodiment 3 is described with reference to FIG. 2 and FIG. 4, three inwardly concave hemispherical surfaces are disposed on a bottom of the lower support base 3, three threaded holes are disposed on the base 4 with respect to positions of the three inwardly concave hemispherical surfaces, three supporting screws 10 are respectively disposed in the three threaded holes, a nut of each of the supporting screws 10 has an outwardly convex hemispherical surface, the outwardly convex hemispherical surface on each of the supporting screws 10 is matched with a respective one of the inwardly concave hemispherical surfaces of the support base 3, and a shape formed by connection lines of any point on respective axes of the three supporting screws 10 is a triangle.

According to the embodiment 3, a supporting height of the shaft base 1 is adjusted, the axis of the shaft base 1 stay in horizontal, and installation is convenient.

The other composition and connection relationship are the same as the embodiment 1.

Embodiment 4: the embodiment 4 is described with reference to FIG. 3, four tension springs 8 are disposed between the upper support base 2 and the bottom base 4, each two of the tension springs 8 form a group, and two groups of the tension springs 8 are symmetrically disposed on two sides of the axis of the first semi-cylindrical surface.

The purpose of providing four extension springs 8 is to keep the axis of the shaft base 1 in a horizontal state.

The other composition and connection relationship are the same as the embodiment 1.

Figure 9:
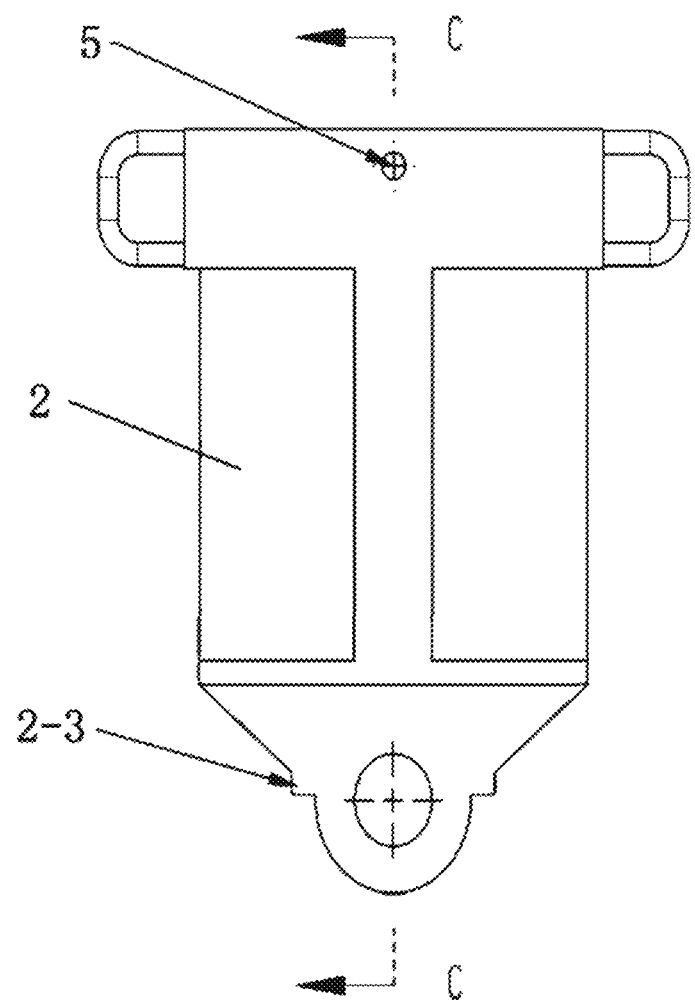
FIG. 9 is a side schematic diagram of the upper support base 2.
Figure 10:
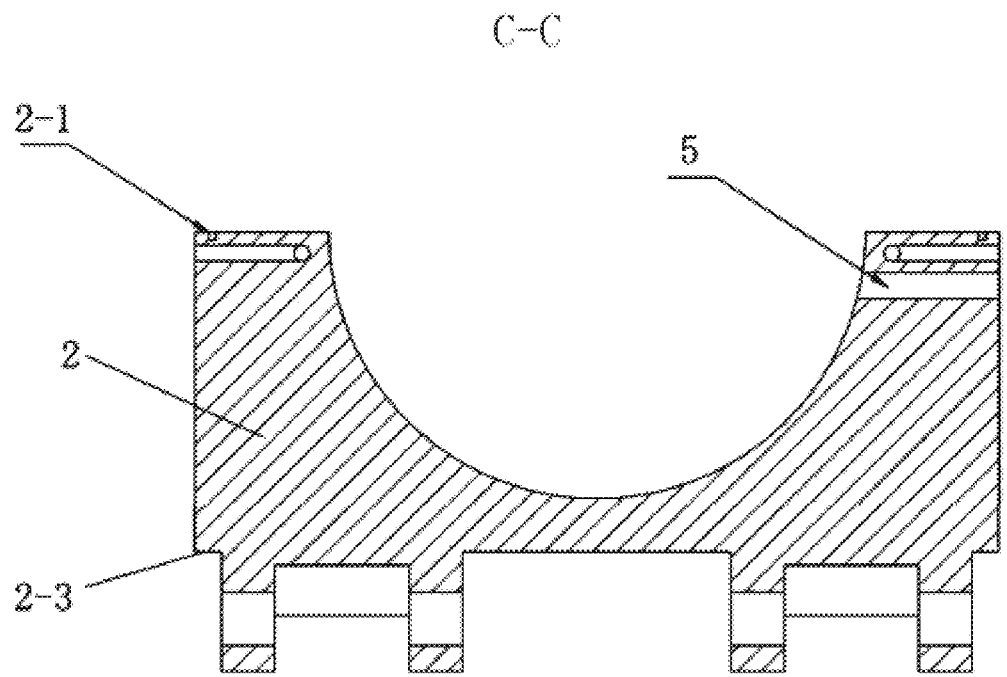
FIG. 10 is a cross-sectional schematic diagram taken along line C-C of FIG. 9.
Figure 11:
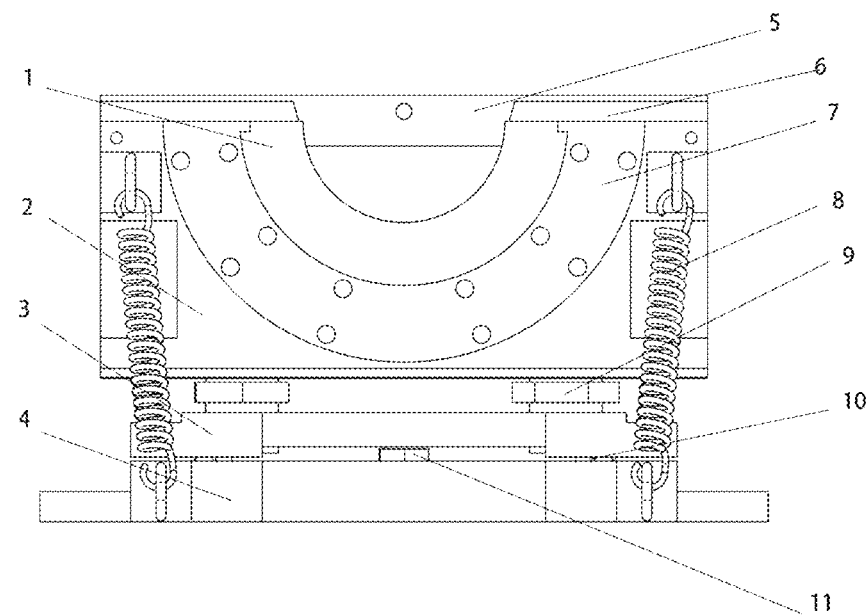
FIG. 11 is a schematic diagram of a second technical solution of the present disclosure.
Figure 12:
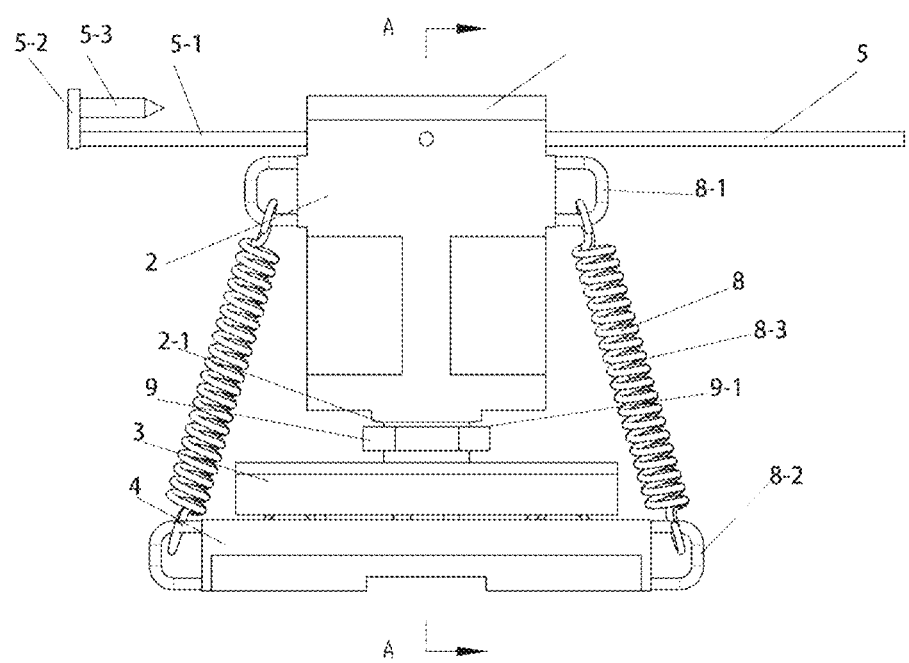
FIG. 12 is a side schematic diagram of FIG. 11.
Figure 13:
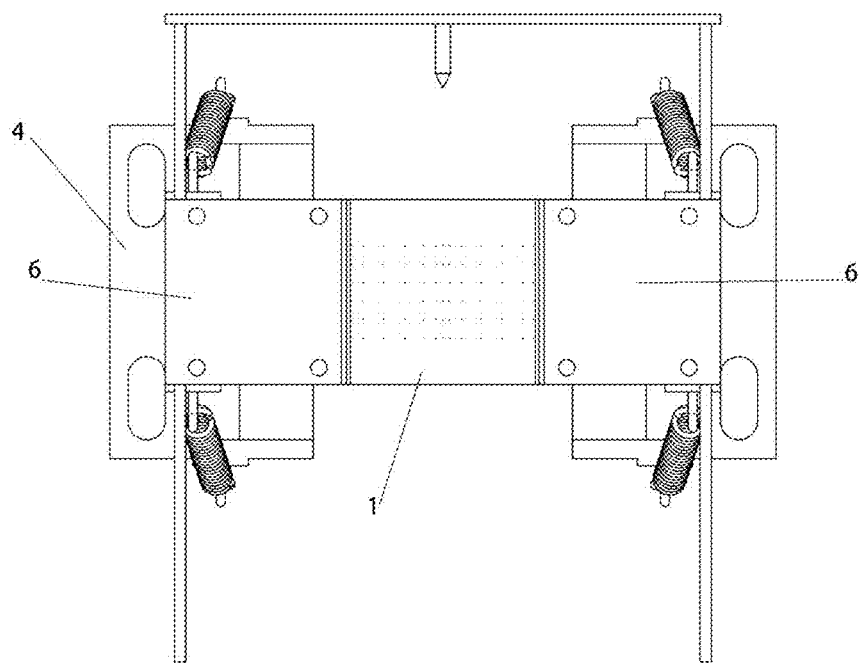
FIG. 13 is a top schematic diagram of FIG. 11.
Figure 14:
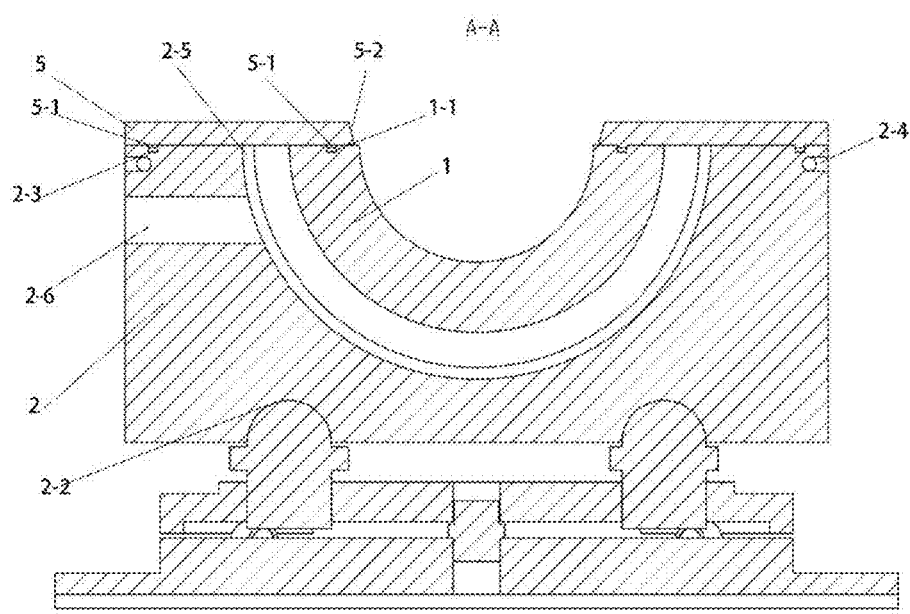
FIG. 14 is a cross-sectional schematic diagram taken along line A-A of FIG. 12.
Figure 15:
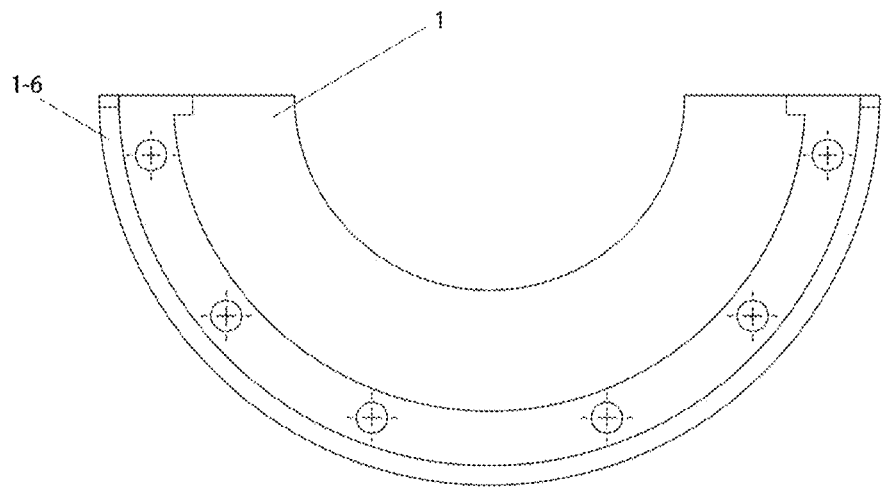
FIG. 15 is a front schematic diagram of a bearing 1.
Figure 16:
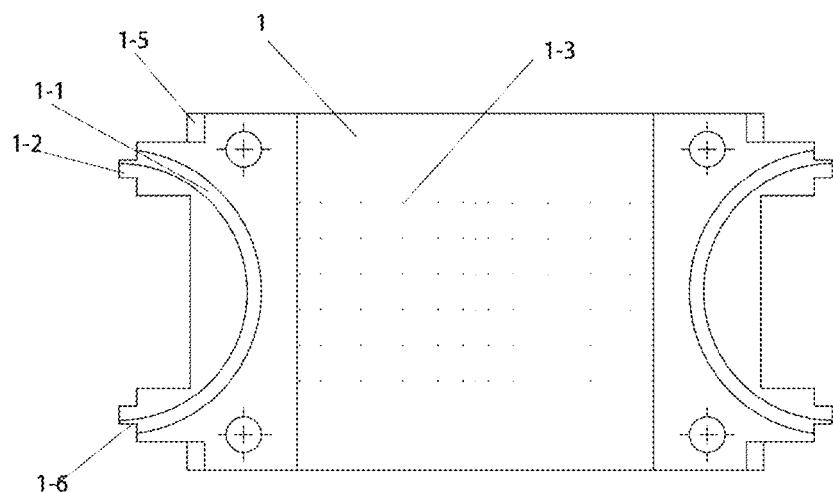
FIG. 16 is a top schematic diagram of the bearing 1.
Figure 17:
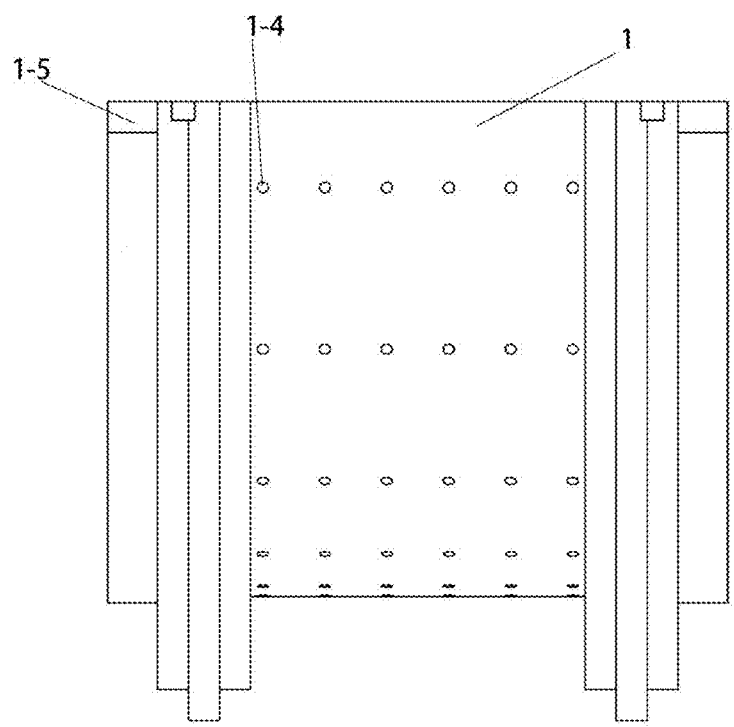
FIG. 17 is a side schematic diagram of the bearing 1.
Figure 18:
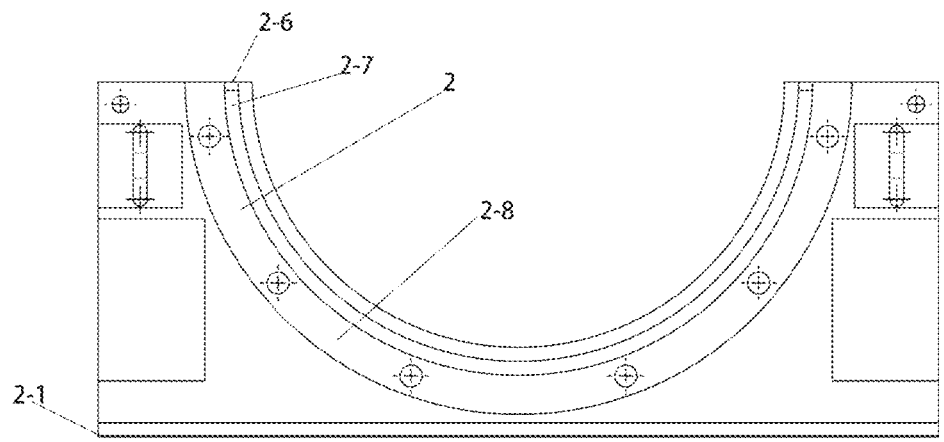
FIG. 18 is a front schematic diagram of a bearing base 2.
Figure 19:
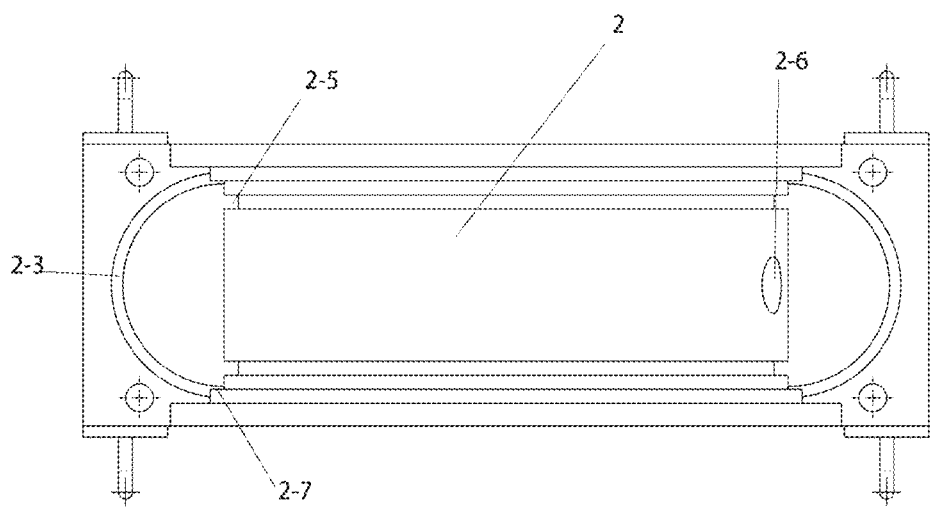
FIG. 19 is a top schematic diagram of the bearing base 2.
Figure 20:
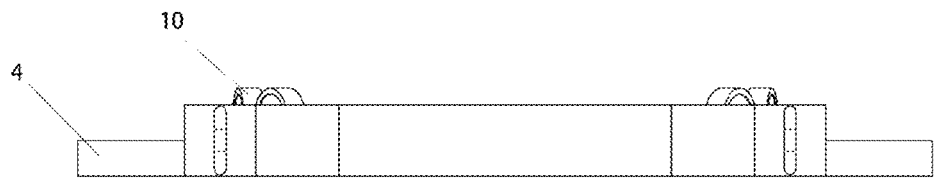
FIG. 20 is a schematic diagram of a lower base.
Figure 21:
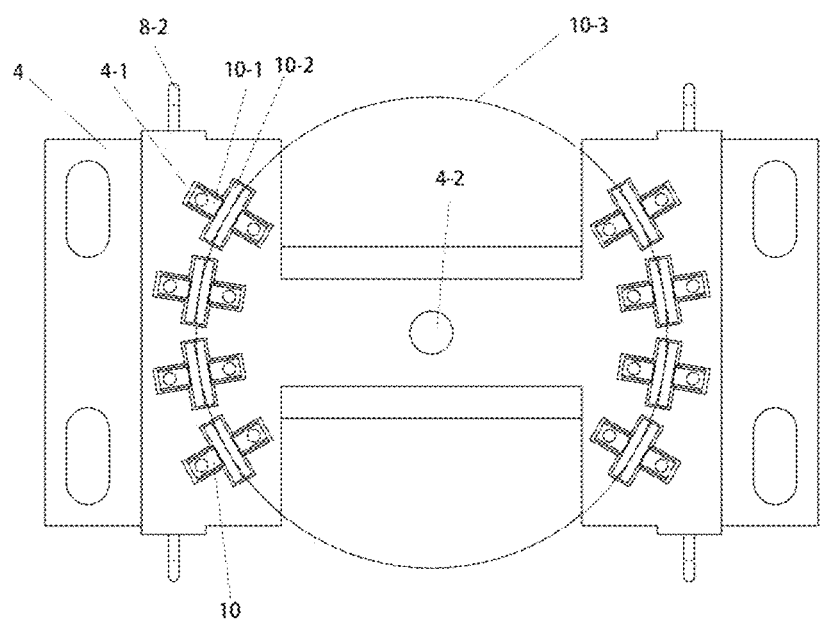
FIG. 21 is a top schematic diagram of the lower base.
Figure 22:
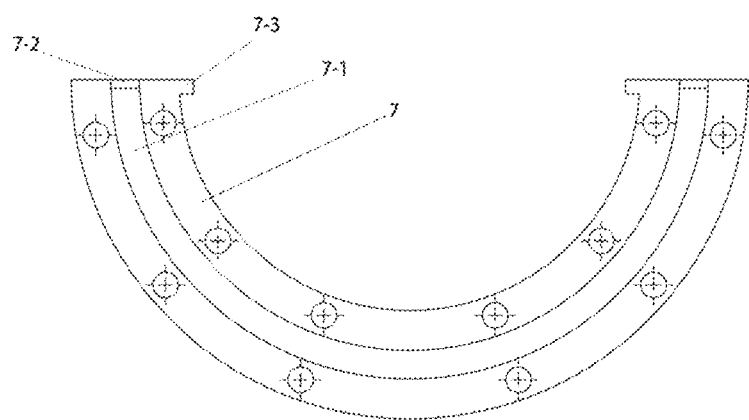
FIG. 22 is a front schematic diagram of a transverse pressing plate.
Figure 23:
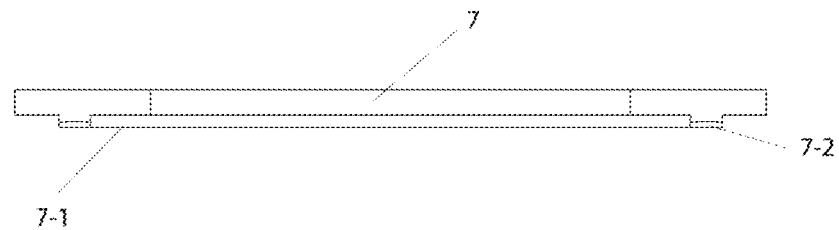
FIG. 23 is a top schematic diagram of the transverse pressing plate.
Figure 24:
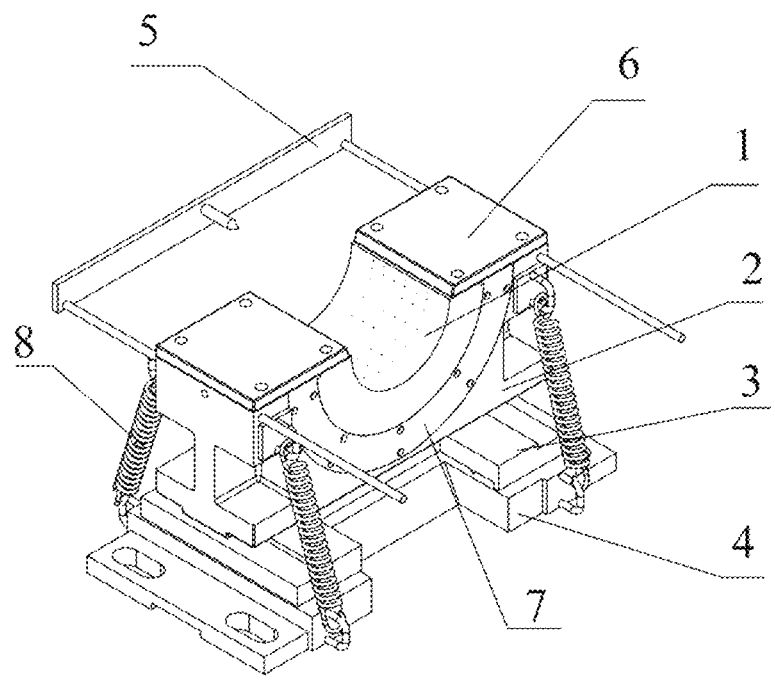
FIG. 24 is a 3D schematic diagram of the second technical solution of the present disclosure.
Figure 25:
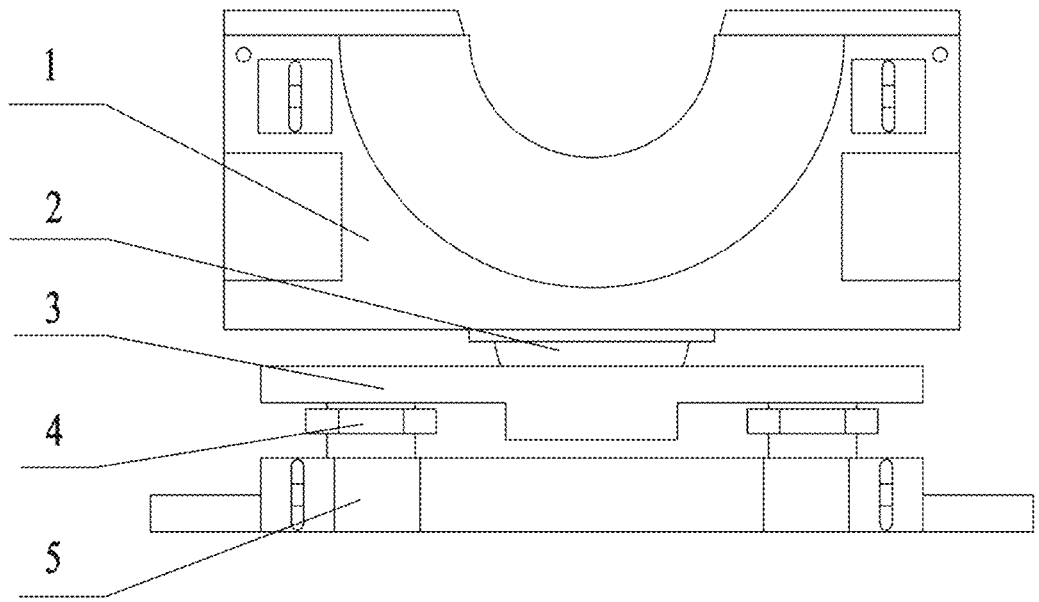
FIG. 25 is a front schematic diagram of an assembly of a third technical solution of the present disclosure.
Figure 26:
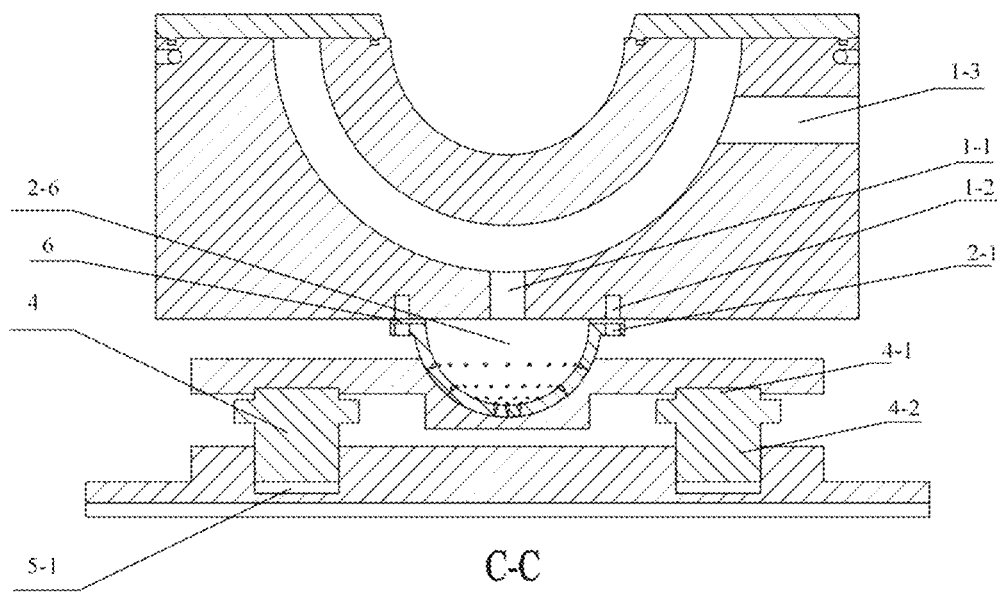
FIG. 26 is a cross-sectional schematic diagram of the assembly.
Figure 27:
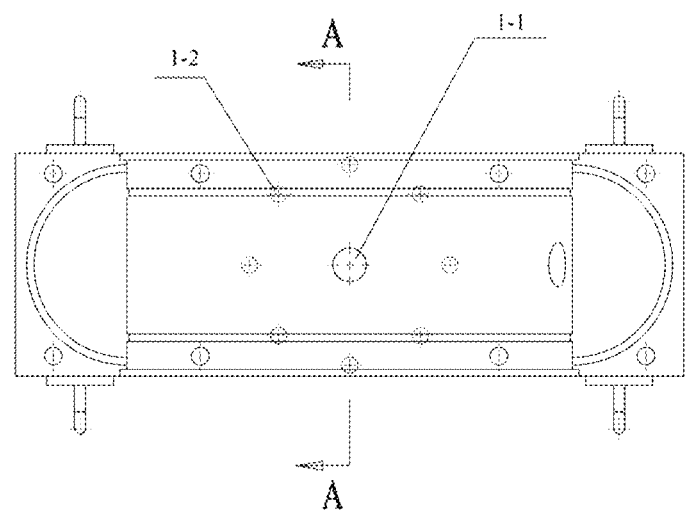
FIG. 27 is a top schematic diagram of a bearing base.
Figure 28:
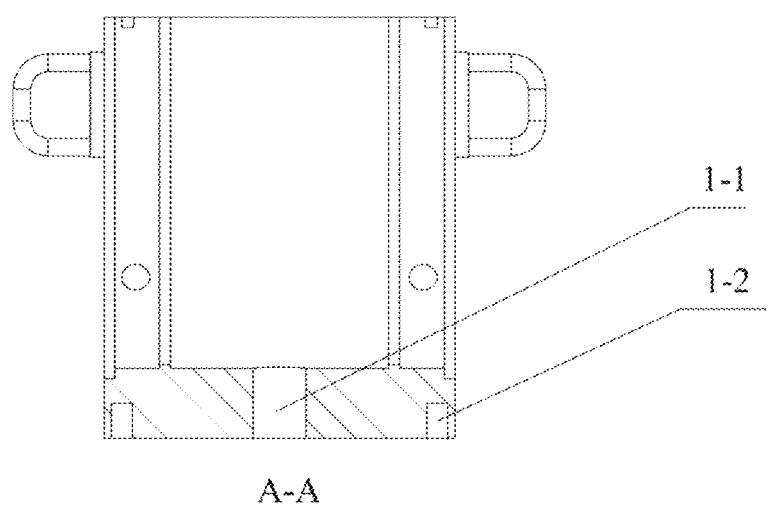
FIG. 28 is a cross-sectional schematic diagram of the bearing base.
Figure 29:
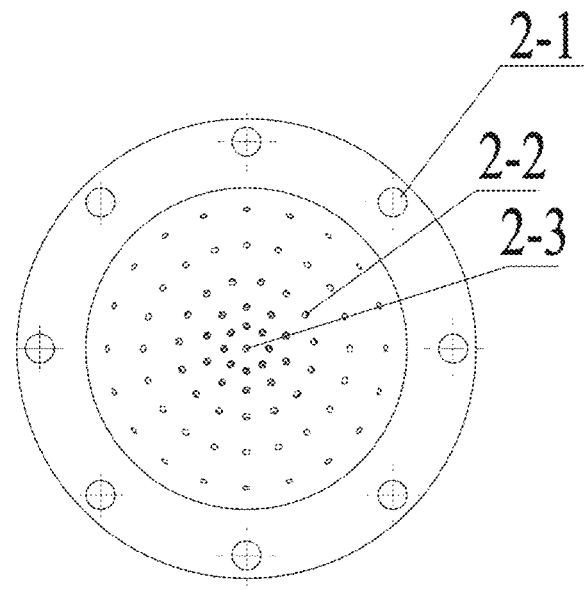
FIG. 29 is a top schematic diagram of an air flotation pillar.
Figure 30:
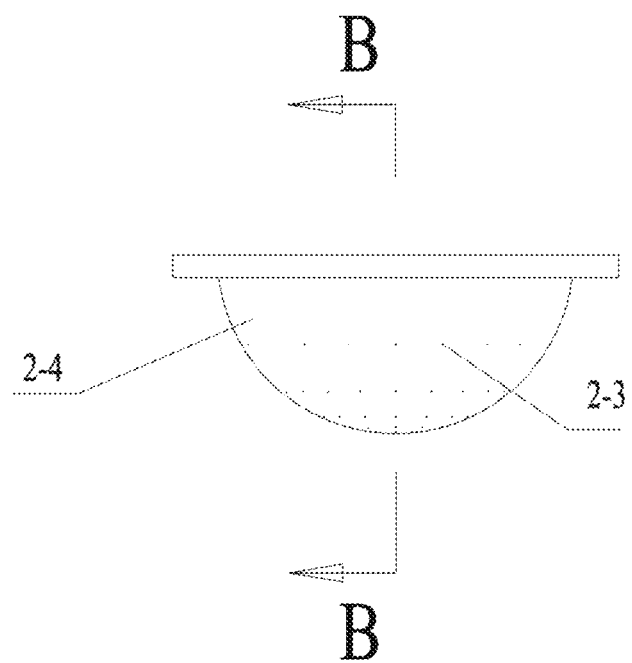
FIG. 30 is a left schematic diagram of the air flotation pillar.
Figure 31:
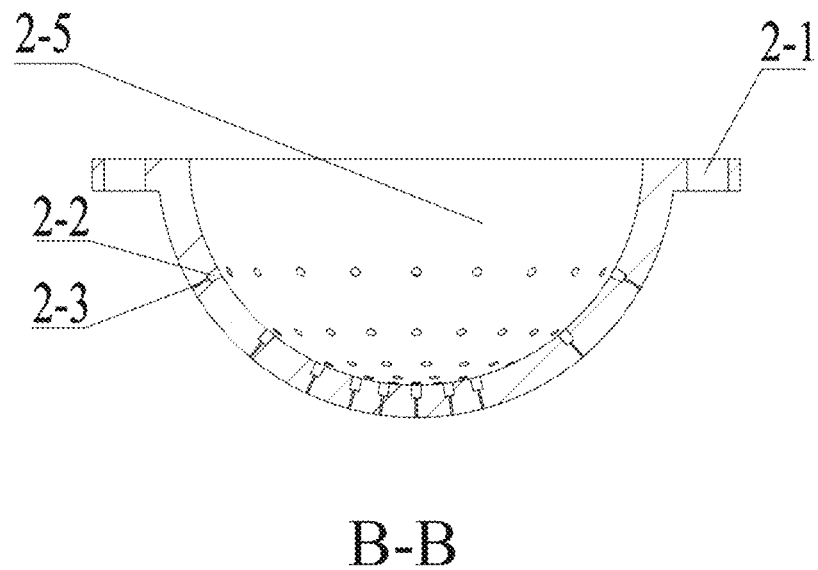
FIG. 31 is a cross-sectional schematic diagram of the air support pillar.
Figure 32:
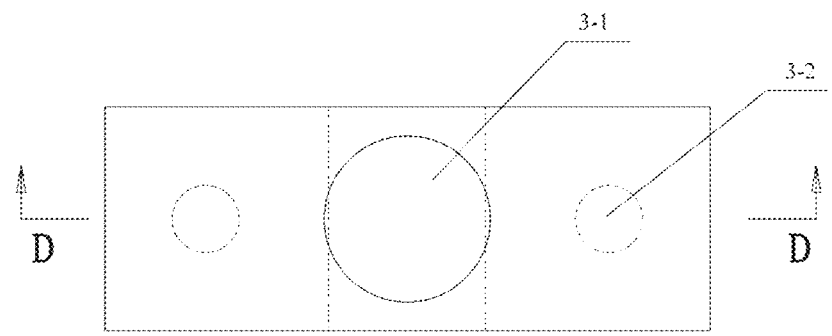
FIG. 32 is a top schematic diagram of an upper base.
Figure 33:
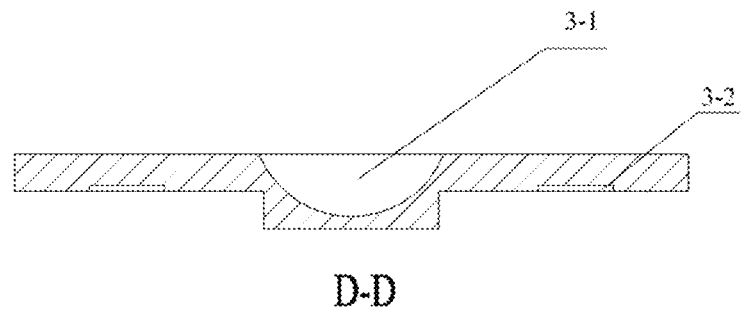
FIG. 33 is a cross-sectional schematic diagram of the upper base.
Figure 34:
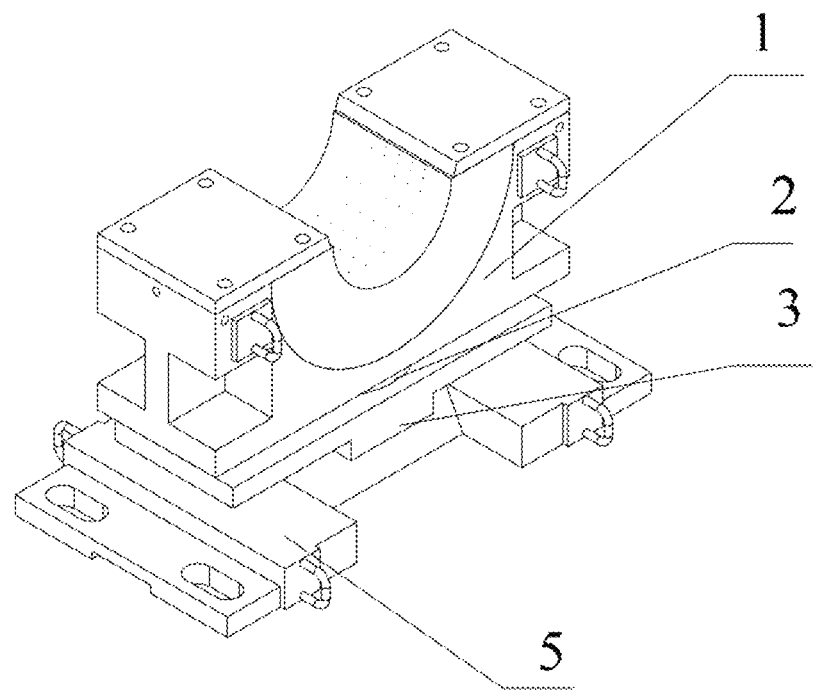
FIG. 34 is a 3D schematic diagram of the third technical solution of the present disclosure.
Figure 35:
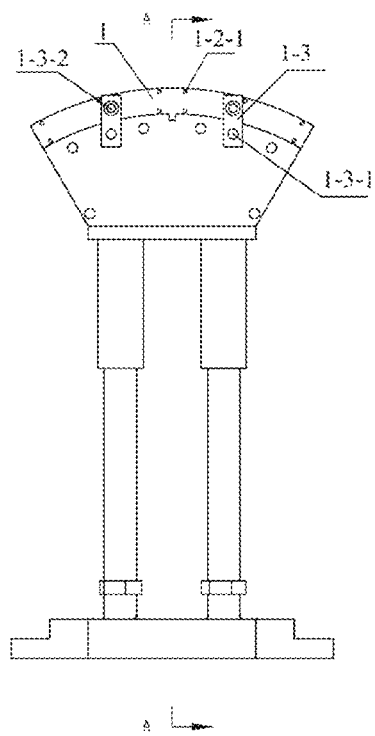
FIG. 35 is a front schematic diagram of an assembly of a fourth technical solution of the present disclosure.
Figure 36:
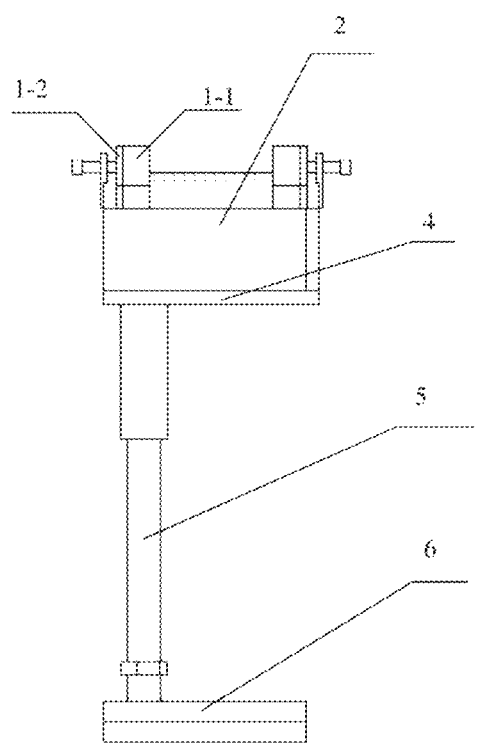
FIG. 36 is a side schematic diagram of the assembly.
Figure 37:
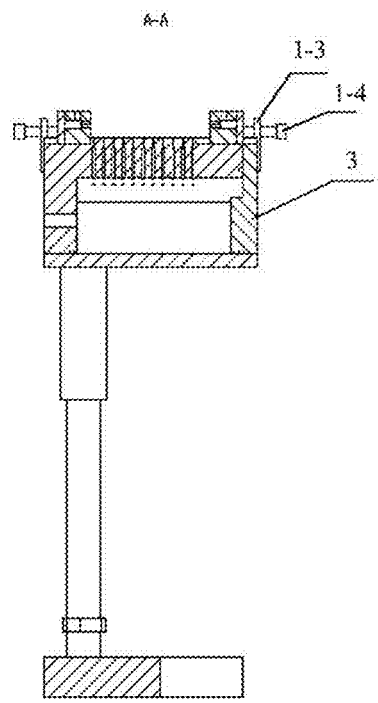
FIG. 37 is a cross-sectional schematic diagram of the assembly.
Figure 38:
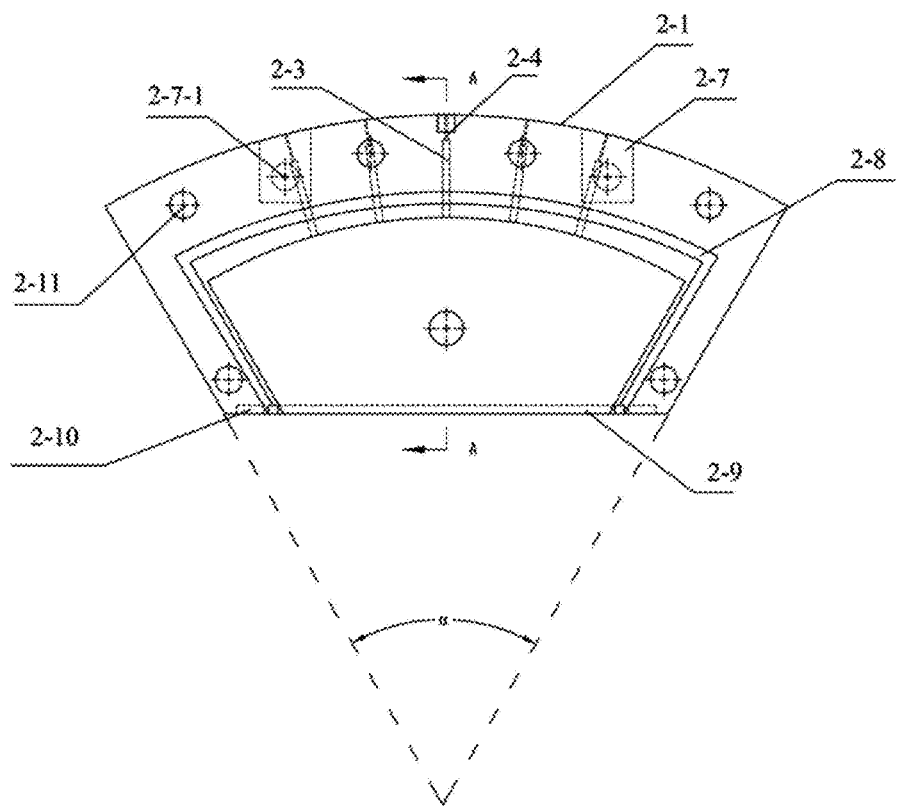
FIG. 38 is a front schematic diagram of an air flotation support structure.
Figure 39:
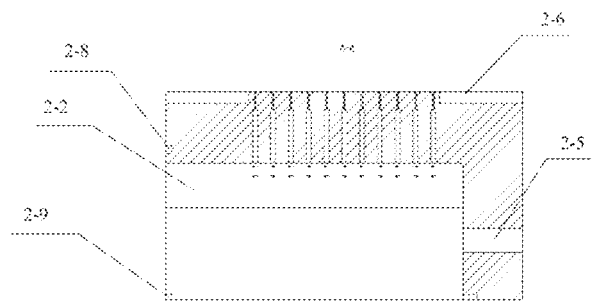
FIG. 39 is a cross-sectional schematic diagram of the air flotation support structure.
Figure 40:
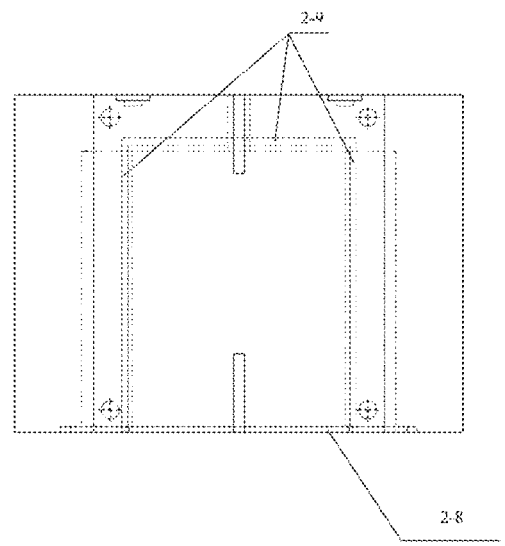
FIG. 40 is a top schematic diagram of the air flotation support structure.
Figure 41:
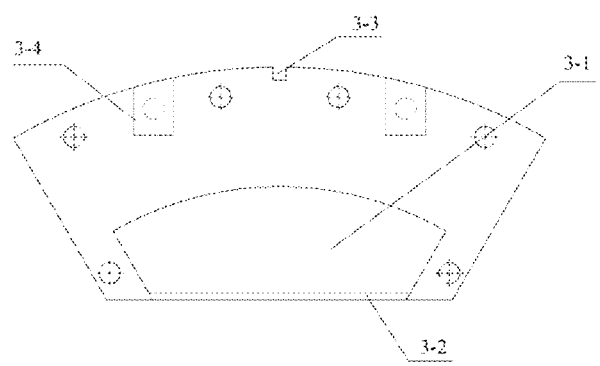
FIG. 41 is a front schematic diagram of an axial seal pressing plate.
Figure 42:
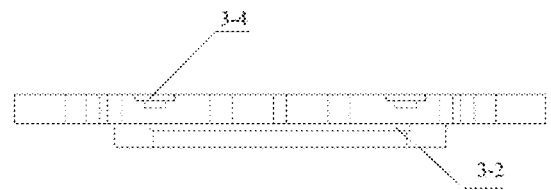
FIG. 42 is a plan schematic diagram of the axial sealing pressing plate.
Figure 43:
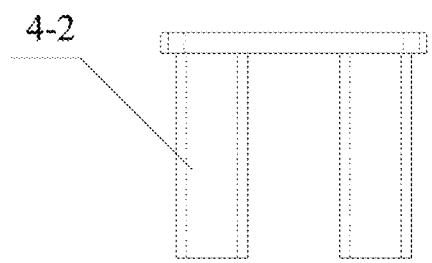
FIG. 43 is a front schematic diagram of the radial sealing pressing plate.
Figure 44:
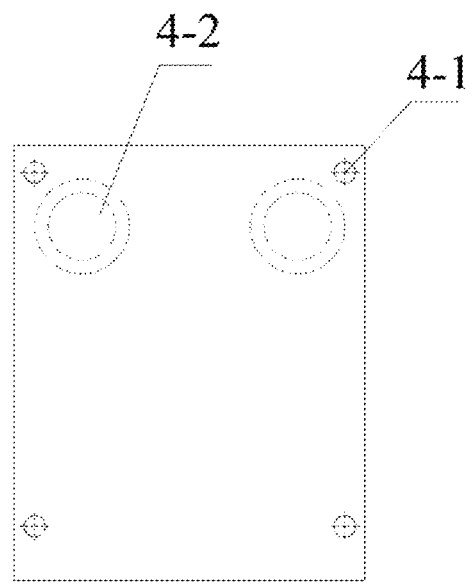
FIG. 44 is a plan schematic diagram of the radial sealing pressing plate.
Figure 45:
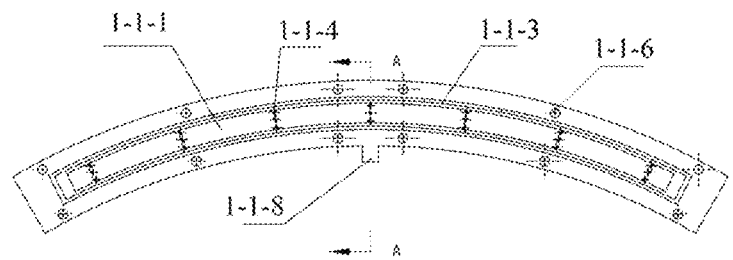
FIG. 45 is a front schematic diagram of an axial positioning thrust plate.
Figure 46:
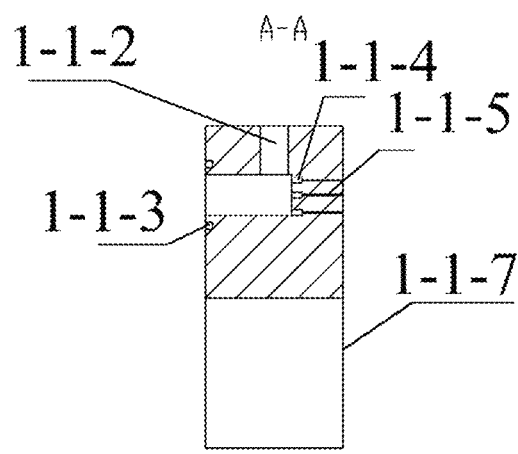
FIG. 46 is a cross-sectional schematic diagram of axial positioning plate.
Figure 47:
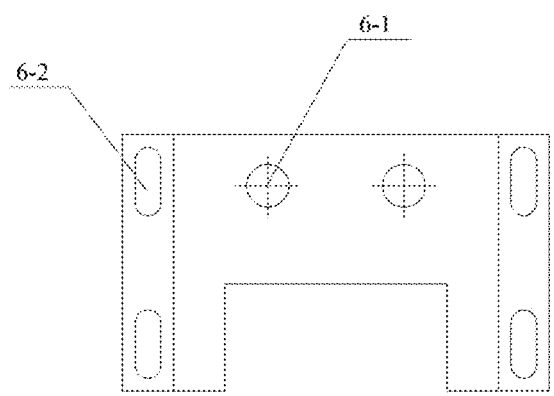
FIG. 47 is a top schematic diagram of the bottom plate.
Figure 48:
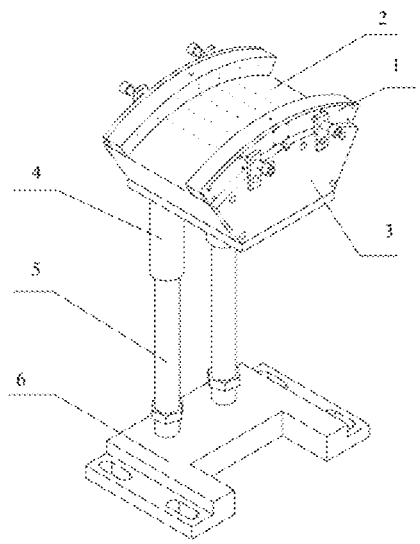
FIG. 48 is a 3D schematic diagram of the fourth technical solution of the present disclosure (the air flotation support structure 2 is a structure smaller than a semi-cylindrical structure).

Embodiment 5: the embodiment 5 is described with reference to FIG. 2, FIG. 9 and FIG. 10, a range of a swing angle of the upper support base 2 and the lower support base 3 is 2° ~4°.

Preferably, the bottom of the upper support base 2 is defined with a first boss 2-3 and a through hole, the top of the lower support base 3 is defined with a second boss 3-1 and a connecting hole, the through hole of the upper support base 2 and the connecting hole of the lower support base 3 are concentric and connected by a connecting shaft, the first boss 2-3 of the upper support base 2 and the second boss 3-1 of the lower support base 3 are disposed oppositely, a range of an angle between the plane of the first boss 2-3 of the upper support base 2 and the plane of the second boss 3-1 of the lower support base 3 is 2° ~4°, and when the upper support base 2 and the lower support base 3 swing relatively, the first boss 2-3 and the second boss 3-1 are configured to define the swing angle of the upper support base 2 and the lower support base 3.

The other composition and connection relationship are the same as the embodiment 1.

Embodiment 6: the implementation manner 6 is described with reference to FIGS. 4-10, a second semi-cylindrical surface is further disposed on the shaft base 1, and the second semi-cylindrical surface is convex outwards. Semi-circular protrusions 1-5 are respectively disposed on two ends of the second semi-cylindrical surface, the second semi-cylindrical surface and the first semi-cylindrical surface on the shaft base 1 are concentrically disposed, a groove 1-3 and two first semi-annular sealing grooves 1-2 are disposed on the second semi-cylindrical surface, the two first semi-annular sealing grooves 1-2 are parallelly disposed, the groove 1-3 is disposed between the two first semi-annular sealing grooves 1-2, and a rubber sealing strip is disposed in each of the first semi-annular sealing grooves 1-2. A third semi-cylindrical surface is disposed on the upper support base 2, the third semi-cylindrical surface is concave inwards, two semicircular ring grooves 2-2 are disposed on one end of the third semi-cylindrical surface, the two semi-circular ring grooves 2-2 are parallelly disposed, each of the semicircular protrusions 1-5 is matched with each of the semicircular ring grooves 2-2, and the third semi-cylindrical surface is matched with the second semi-cylindrical surface to form the sealed air cavity 6 between the groove 1-3 and the first semi-cylindrical surface. Two second semi-annular sealing grooves 1-4 are further disposed on the shaft base 1, and the two second semi-annular sealing grooves 1-4 are disposed on two sides of the axis of the first semi-cylindrical surface inwardly concaved. Two third semi-annular sealing grooves 2-1 are further disposed on the upper support base 2, and the two third semi-annular sealing grooves 2-1 are disposed on two sides of an axis of the second semi-cylindrical surface. Each of the third semi-annular sealing grooves 2-1 is matched with each of the second semi-annular sealing grooves 1-4 to form a complete O-ring groove, an O-shaped rubber sealing ring is disposed on each of the O-ring grooves, and each of the O-shaped rubber sealing rings is pressed by a pressing plate 9. The shaft base 1 and the upper support base 2 are respectively connected with the pressing plate 9 by screws, and the screws on the shaft base 1 penetrate through the pressing plate 9 and are connected with the shaft base 1 and the upper support base 2, so that the rubber sealing strip in each of the first semi-annular sealing grooves 1-2 is tightly attached to the second semi-cylindrical surface on the upper support base 2.

The other composition and connection relationship are the same as the embodiment 1.

Figure 5:
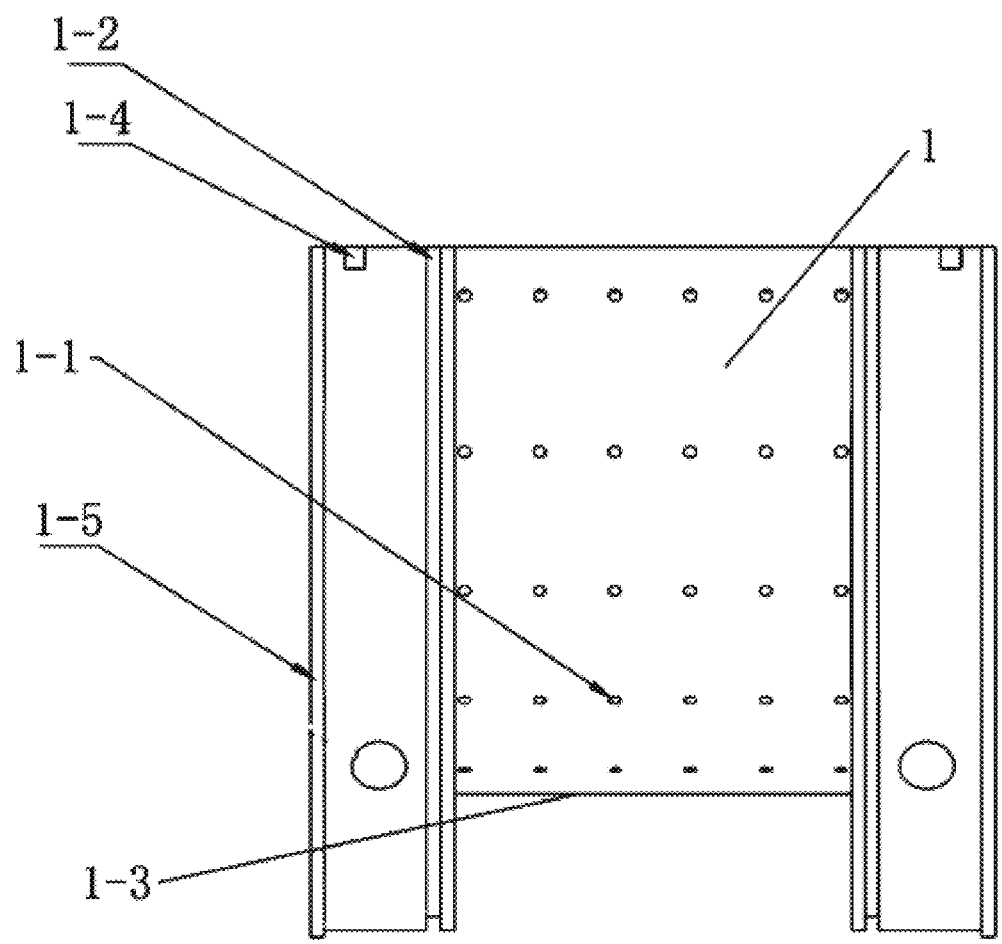
FIG. 5 is a schematic diagram of a shaft base 1 (an enlarged side view).
Figure 6:
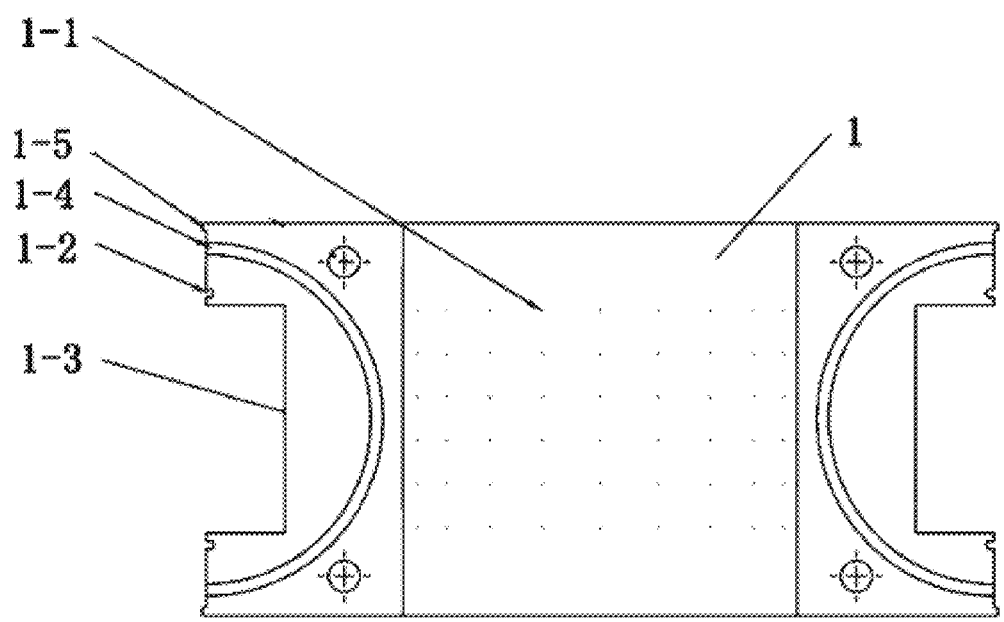
FIG. 6 is a top schematic diagram of the shaft base 1.
Figure 7:
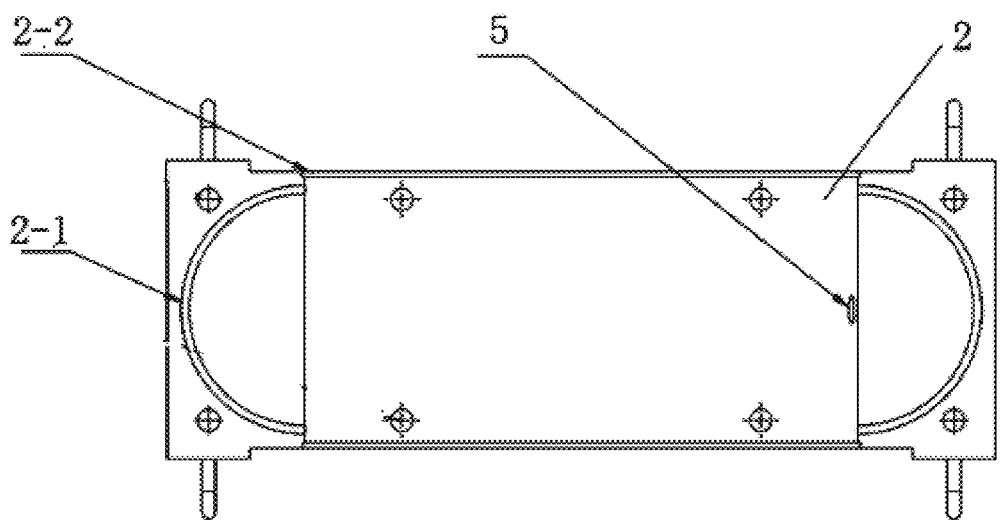
FIG. 7 is a top schematic diagram of an upper support base 2.
Figure 8:
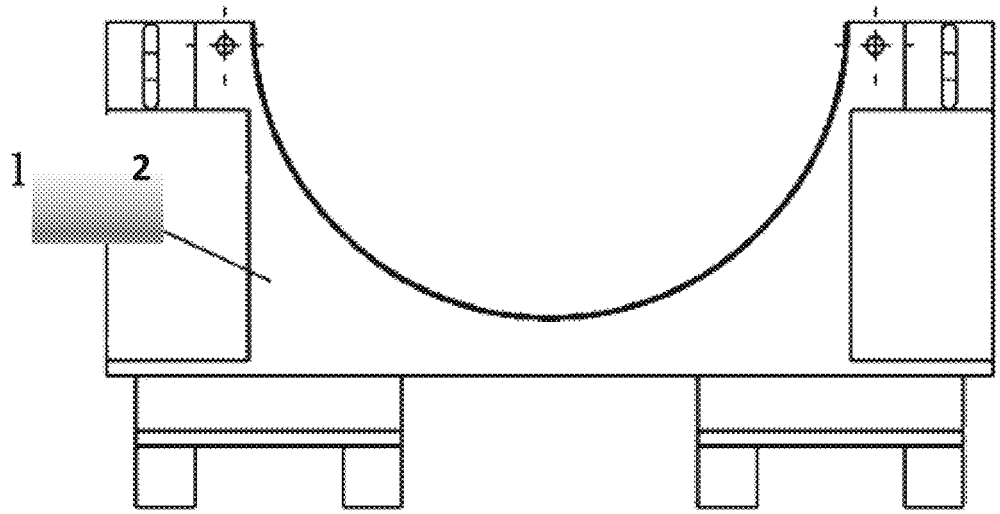
FIG. 8 is a front schematic diagram of the upper support base 2.

Embodiment 7: the embodiment 7 is described with reference to FIG. 5, a distribution of the plurality of the air holes 1-1 is increasingly dense from two sides of the axis of the first semi-cylindrical surface to a center of the axis of the first semi-cylindrical surface.

When the first semi-cylindrical surface of the embodiment 7 is in contact with the rotor, due to the gravity effect of the rotor, the air holes 1-1 at the bottommost part of the first semi-cylindrical surface in contact with the rotor are distributed more, and a bearing capacity of the present disclosure is improved.

The other composition and connection relationship are the same as the embodiment 1.

Working principle: the base 4 of the present disclosure is fixed on the installation device, the shaft base 1 is in contact with the rotor to be supported, the sealed air cavity 6 is inflated by the air pump on the external air pressure device to generate a positive pressure in the sealed air cavity 6, a gas in the sealed air cavity 6 penetrates through, a plurality of air holes 1-1 on the shaft base 1 enter the contact surface of the rotor and the shaft base 1 to form a gas mold, and when the rotor deflects, the shaft base 1 deflects at a certain angle relative to the base 4 to adapt to the deflection of the rotor.

Embodiments and working principle of the technical solution 2 are shown in FIGS. 11-24.

Embodiment 1: a split-type swing angle adjustable aerostatic bearing device for rotor static balance in the embodiment 1 is a portable high-precision rotor static balance device, which includes a bearing 1, a bearing base 2, a sealed working air cavity, an upper base 3, a lower base 4, pillars 9. A semi-cylindrical working surface is disposed on the bearing 1, and a plurality of micro air holes 1-3, having a certain depth, are disposed on the semi-cylindrical working surface. A second semi-cylindrical working surface is disposed on the bearing 1, and a plurality of small air holes 1-4, having a certain depth, are disposed on the second semi-cylindrical working surface. The plurality of the micro air holes 1-3 are communicated with the plurality of the small air holes 1-4, the bearing 1 is fixed on the bearing base 2 to form a sealed working air cavity between, the plurality of the small air holes 1-4 are communicated with the sealed working air cavity, the sealed working air cavity is filled with medium-pressure gas through an air inlet channel 2-6, the bearing base 2 and the upper base 3 are in spherical contact with the two pillars 9, and further swing at a certain angle in a vertical direction, the upper base 3 and the lower base 4 are rotated by a certain angle along a circumferential direction of the upper base 3 and the lower base 4 through a rotating device 10. When the rotor is in static balance, the rotor is placed on the working surface of the bearing, the external air supply device is configured for sealing the air supply in the working air cavity through the air inlet channel 2-6, the gas is blown out from the micro air holes on the working surface of the bearing, a gas film bearing a certain bearing is formed between the working surface and the rotor to float the rotor and balance the rotor statically.

Embodiment 2: the sealed working air cavity in the embodiment 2 includes a bearing 1, a bearing base 2, a vertical pressing plate 6 and a transverse pressing plate 7. A first half O-ring groove 1-1 is disposed on two sides of the bearing 1, a second half O-ring groove 2-3 is disposed on two sides of the bearing base 2, a gap 7-2 is disposed on the transverse pressing plate 7. The first half O-ring groove 1-1, the second half O-ring groove 2-3, and the gap 7-2 form two O-ring grooves. An O-shaped silicone sealing ring is disposed in each of the two O-ring grooves, each of the O-ring grooves is pressed by the vertical pressing plate 6, the vertical pressing plate 6 is connected to the bearing 1 and the bearing base 2 through a connecting piece, first half-circular sealing grooves 1-6 are disposed in front and back sides of the bearing 1, second half-circular sealing grooves 2-7 are disposed in front and rear sides of the bearing base 2, the first half-circular sealing grooves 1-6 and the second half-circular sealing grooves form a third half-circular sealing grooves, half-circular silicone gaskets of the same size are disposed on the third half-circular sealing grooves, the two ends of the half-circular silicone gasket are located directly under the O-shaped silicone gasket, each of the half-circular silicone gaskets is pressed by the transverse pressing plate 7, the transverse pressing plate 7 is connected to the bearing 1 and the bearing base 2 through a connecting piece to form the sealed working air cavity. At least one cylindrical protrusion 1-2 is disposed on the bearing 1, the cylindrical protrusion 1-2 is tightly attached to a third cylindrical surface of the bearing base 2, an axial positioning protrusion structure 2-5 of the bearing 1 is disposed on the bearing base 2, a positioning notch 1-5 of the transverse pressing plate 7 is disposed on the bearing 1, a positioning protrusion 7-3 is disposed on the transverse pressing plate 7, and the positioning protrusion 7-3 is matched with the positioning notch 1-5.

Embodiment 3: O-shaped annular protrusions 5-1 matched with the O-ring grooves are disposed on a lower surface of the vertical pressing plate 5 in the embodiment 3, a height of the O-shaped annular protrusions 5-1 is smaller than a depth of the O-ring grooves, and a cut 5-2, having a certain gradient is disposed on the vertical pressing plate 5 near the semi-cylindrical working surface to prevent collision and friction between the vertical pressing plate and a rotor.

Embodiment 4: a spherical surface is disposed on an upper end of the pillar 9 in the embodiment 4, a platform 9-1 is disposed on a middle part of the pillar 9. A hemispherical surface 2-2 is disposed on a lower bottom surface of the bearing base 2, the hemispherical surface 2-2 is matched with the spherical surface of the pillar 9. Swing limiting cut surfaces 2-1, having a certain angle, are disposed on two sides of the bottom end of the bearing base 2 (when the bearing base swings, the swing limiting platform is in contact with the platform 9-1 to prevent the bearing base from falling), and the pillar 9 is threadedly connected with the upper base 3.

Embodiment 5: a rotating device 10 in the embodiment 5 includes a plurality of rolling bearing shafts 10-1 and rolling bearings 10-2. A plurality of semi-cylindrical grooves are respectively disposed on two opposite ends of the lower base 4, the plurality of semi-cylindrical grooves are disposed in a circumferential direction along a circle 10-3, each of the rolling bearing shafts 10-1 is disposed in a respective one of the semi-cylindrical grooves through the rolling bearings 10-2, a number of the plurality of rolling bearing shafts 10-1 is same to a number of the semi-cylindrical grooves, the plurality of rolling bearing shafts 10-1 are vertically recessed, a part of a body structure of each of the rolling bearing shafts 10-1 protrudes from the lower base 4. A concave surface is respectively disposed on a lower part of the upper base 3, the concave surface is in contact with surfaces of the plurality of the rolling bearings 10-2, and the upper base 3 is rotated by the rolling bearings 10-2 disposed in a circumferential direction.

Embodiment 6: the embodiment 6 includes a rotation center positioning shaft 11 on the upper bottom surface, a cylindrical hole is disposed in the center of the upper base 3, the cylindrical hole is in clearance fit with the rotation center positioning shaft 11, a threaded hole is disposed in a center of the lower base 4, and the threaded hole is threadedly connected with the rotation center positioning shaft 11.

Embodiment 7: the embodiment 7 includes the rotor axial positioning device 5, the rotor axial positioning device 5 includes a baffle plate 5-2, two guide rods 5-1, and a positioning cone 5-3. The positioning cone 5-3 is in a structure combined with a cylinder and a cone, the cone on the positioning cone 5-3 is concentric with the semi-cylindrical working surface, the positioning cone 5-3 is disposed on the baffle plate 5-2, the two guide rods 5-1 are slidably disposed on the bearing base 2, and a top wire 2-4 is disposed on the bearing base 2 to fix each of the guide rods 5-1.

Embodiment 8: the embodiment 8 further includes an overall connection structure 8, the integral connection structure 8 includes a tension spring 8-3, a hook 8-1 and a draw hook 8-2, the number of tension spring 8-3 is 4, a hook 8-1 is disposed on the bearing base 2, a hook 8-2 is disposed on the lower base 4, and both ends of the tension spring 8-3 are respectively hung on the hook 8-1 and the hook 8-2, so that the bearing base 2 and the lower base 4 are connected as a whole.

Embodiments and working principle of the technical solution 3 are shown in FIGS. 25-34.

A split-type swing angle adjustable aerostatic bearing device for rotor static balance in the technical solution 3 provides another support structure of a bearing base, including a bearing base 1, an air flotation support cover 2, an upper base 3, pillars 4, and a lower base 5. A first through hole 1-1 in a cylindrical shape is disposed on the bearing base 1, internal threaded holes 1-2 are disposed on the lower bottom surface of the bearing base 1, second through holes 2-1 in a cylindrical shape are disposed on the air flotation support cover 2, the air flotation support cover 2 and the bearing base 1 are connected to the internal threaded holes 1-2 through bolts penetrating through the second through holes 2-1, sealing rings 6 are disposed between the air flotation support cover 2 and the bearing base 1, the air flotation support cover 2 and the bearing base 1 form a gas working air cavity 2-6, a plurality of large air holes 2-2 are disposed on an inner surface 2-5 of the air flotation support cover 2, a plurality of small air holes 2-3 are further disposed on the inner surface 2-5 of the air flotation support cover 2, the plurality of the small air holes 2-3 penetrates through the air flotation support cover 2 to an outer surface 2-4 of the air flotation support cover 2, the plurality of the large air holes 2-2 are communicated with the plurality of the small air holes 2-3, the plurality of the large air holes 2-2 are further communicated with the working air cavity 2-6. A concave spherical surface 3-1 is disposed on the upper base, the concave spherical surface 3-1 is in clearance fit with the outer surface of the air flotation support cover 2-4, and the air flotation support cover 2 is disposed in the concave spherical surface 3-1. In a working condition, after gas in the working air cavity 2-6 penetrates through the plurality of the large air holes 2-2 and the plurality of the small air holes 2-3, a gas mold, having a certain bearing capacity, is formed between the outer surface of the air flotation support cover 2-4 and the concave spherical surface 3-1 to float the bearing base 1, the bearing base 1 freely swings to realize automatic centering of a rotor static balance device, circular grooves 3-2 are disposed on two sides of the upper base 3, a boss 4-1 is disposed on an upper end of each of the pillars 4, the grooves 3-2 are disposed on the respective boss 4-1 to support the upper base 3, external threads 4-2 are disposed on a lower end of each of the pillars 4, internal threads 5-1 are disposed on two sides of the lower base 5, the pillars and the lower base are connected through the external treads and the internal threads, and an elevation of the bearing base is adjusted through rotating the pillars 4.

Embodiments and working principle of the technical solution 4 are shown in FIGS. 35-49.

An air flotation support device for static balance of the rotating ring-shaped part in the technical solution 4 is configured to statically balance rotating ring-shaped parts. Similar to the principle of the aforementioned technical solutions, the technical solution 4 adopts the principle of air flotation support, the aforementioned technical solutions perform static balance on the shaft, and the technical solution 4 statically balances the rotating ring-shaped parts (hollow parts), such as gear sleeves, shaft sleeves, etc.

An air flotation support device for static balance of rotating ring-shaped parts in the technical solution 4 includes axial positioning devices 1, an air flotation support structure 2, an axial sealing pressing plate 3, a radial sealing pressing plate 4, a connecting pillar 5, and a base 6. The air flotation support structure 2 is configured to support a rotating ring-shaped parts, having a size less than or equal to a semi-cylindrical structure of the rotating ring-shaped parts, an air inlet 2-5 is disposed on a wall of a first end wall of the air flotation support structure 2, the air inlet 2-5 is communicated with a working air cavity 2-2 in the air flotation support structure 2, a range of an angle α between two side walls along a circumferential direction on a working surface 2-1 of the air flotation support structure 2 is 30°~180°, namely that a central angle α with respect to an arc on a cross section of the air flotation support structure 2 is 30°~180°, a plurality of through holes communicated with the working air cavity 2-2 are disposed on a curved side wall of the air flotation support structure 2, an open end surface of a second end of the air flotation support structure 2 is sealed and connected through the axial sealing pressing plate 3, a longitudinal section end of the air flotation support structure 2 is sealed and connected with the radial sealing pressing plate 4, the radial sealing pressing plate 4 is connected with the base 6 through the connecting pillar 5, and the axial positioning devices 1 are respectively disposed on the two ends of the working surface 2-1 of the air flotation support structure 2. In a working state, a gas penetrates through the air inlet 2-5 to the working air cavity 2-2 in the air flotation support structure 2, then penetrates through a plurality of through holes 2-4 and enters the working surface 2-1 of the air flotation support structure 2, and a gas mold, having a certain bearing capacity, is formed between the gas and a cylindrical surface of the rotating ring-shaped parts to be tested for static balance, so as to float the rotating ring-shaped parts to be tested for static balance.

Figure 49:
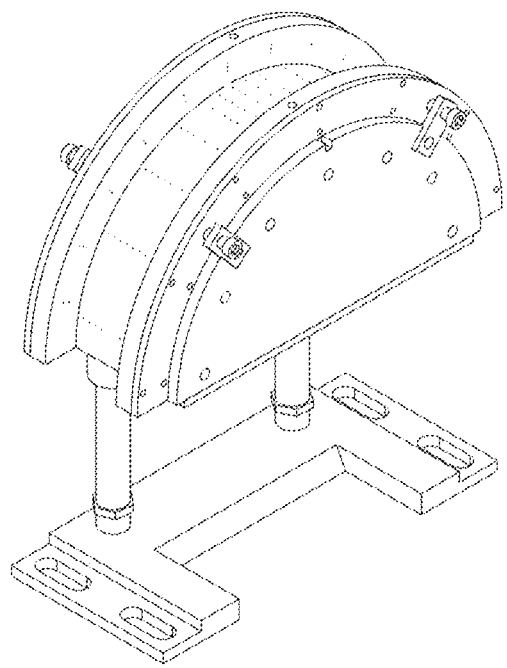
FIG. 49 is a 3D schematic diagram of another structure of technical solution 4 of the present disclosure (the air flotation support structure 2 is a semi-cylindrical structure).

A range of the a angle is 30°~150°, as shown in FIGS. 35-48. The range of the a angle is 180°, as shown in FIG. 49. In practical applications, A range of the angle α is between 45°~90° depending on the specific situation.

The air flotation support structure 2 includes a working surface 2-1, a working air cavity 2-2, a plurality of small cylindrical through holes 2-3, a plurality of micro cylindrical through holes 2-4, an air inlet hole 2-5, an axial positioning groove 2-6 of the axial positioning device 6, an axial positioning groove 2-7 of the axial positioning devices 1, an axial sealing groove 2-8 of the air flotation support structure 2, an internal threaded hole 2-10 connected with the radial sealing pressing plate, and an internal threaded through hole 2-11 connected with the axial sealing pressing plate. In a working state, a medium-pressure gas penetrates through the air inlet 2-5 to the working air cavity, then penetrates through the plurality of small cylindrical through holes 2-3 and the plurality of micro cylindrical through holes 2-4 to the working surface 2-1, and a gas mold, having a certain bearing capacity, is formed between the gas and a cylindrical surface of the rotating ring-shaped parts to be tested for static balance, so as to float the rotating ring-shaped part to be tested for static balance.

Axial sealing pressing plate 3 and semi-cylindrical protrusion 3-1 are matched with air cavity 2-2. The location and width of the sealing groove 3-2 and the circumferential positioning groove 3-3 of the axial positioning device 6 are consistent with the circumferential positioning groove 2-6 of the axial positioning devices 1. The axial positioning groove 3-4 of the axial positioning devices 1 have a threaded hole in the groove 3-4. The axial positioning devices 1 include an axial positioning thrust plate 1-1, an axial positioning sealing plate 1-2, an axial positioning device fixing plate 1-3 and an axial positioning pin 1-4. The axial positioning thrust plate 1-1 includes a thrust plate working air cavity 1-1-1, a thrust plate air inlet channel 1-1-2, and a sealing groove 1-1-3, there is silicone or rubber sealing material in the sealing groove, a plurality of small cylindrical through holes 1-1-4 are disposed on the surface of the thrust plate working air cavity 1-1-1, a plurality of micro cylindrical through holes 1-1-5, and a plurality of cylindrical threaded holes 1-1-6. Thrust working surface 1-1-7, axial positioning boss 1-1-8, cooperate with groove 2-7 and groove 3-3. Cylindrical through holes 1-2-1 are disposed on the axial positioning sealing plate 1-2, the number and position correspond to the plurality of cylindrical threaded holes 1-1-6, the cylindrical through holes 1-2-1 and the cylindrical threaded hole 1-1-6 are connected by bolts. The axial positioning fixing plate 1-3 is matched with the axial positioning groove 2-7 of each of the axial positioning devices 1. A cylindrical through hole 1-3-2 is disposed on the axial positioning and fixing plate 1-3, which is threadedly connected with the cylindrical threaded hole 2-7-1 in the positioning groove. A cylindrical internal threaded hole 1-3-2 is further disposed on the axial positioning and fixing plate 1-3, which is threadedly connected with the axial positioning pin 1-4. in a working state, a medium-pressure gas enters the thrust plate working air cavity 1-1-1 through the thrust plate air inlet channel 1-1-2, then the medium-pressure gas enters the thrust working surface 1-1-7 through the plurality of small cylindrical through holes 1-1-4 and the plurality of micro cylindrical through holes 1-1-5, and a gas mold, having a certain thrust, is formed along an axial end surface of the rotating ring-shaped part to be tested for static balance, and further plays a role in axial positioning.

The cylindrical through hole 4-1 of the radial sealing pressing plate 4 is bolted to the internal threaded hole 2-10. Two cylindrical supporting structures 4-2 with internal threads are threaded to the connecting pillar 5, and the connecting pillar 5 is disposed as a double-ended external thread. The base 6 has two internal threaded through holes 6-1, the base 6 is connected to the radial sealing pressing plate 4 through the connecting pillar 5, and several waist-shaped through holes 6-2 to be fixed to the worktable are disposed on the base 6.

Workflow: fixing the base 6 on the worktable, detaching the axial positioning device 1, then placing the rotating ring-shaped part to be subjected to static balance detection on air flotation support structure 2, mounting the axial positioning device 1, introducing a medium-pressure gas, detecting the cylindrical surface of the rotating ring-shaped parts to be subjected to static balance detection and the working surface 2-1 of the air flotation support structure 2 to form a gas mold with a certain bearing, floating the rotating ring-shaped part to be subjected to static balance detection, and carrying out static balance. Meanwhile, the rotating ring-shaped part to be subjected to static balance detection forms a certain thrust gas film between the two axial end faces and the axial positioning device 1, and the rotating ring-shaped part to be subjected to static balance detection is prevented from falling off in the axial direction. Due to the fact that the rotating ring-shaped part to be subjected to static balance detection is not in hard contact with the static balance device, the friction force is small, and the detection precision is high.

The static balance detection for the motor is carried out by using the first three technical solutions of the present disclosure.

Figure 50:
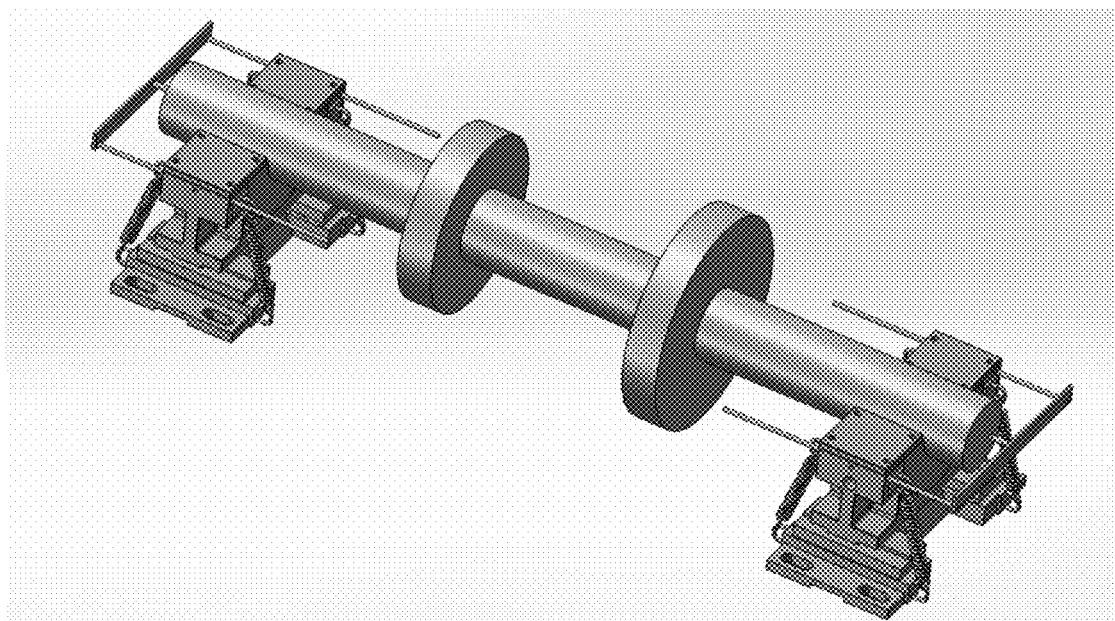
FIG. 50 is a schematic diagram of rotor static balance (with respect to the first three technical solutions of the present disclosure).

As shown in FIG. 50, the two static balance devices are installed on the workbench, the elevation is adjusted, the two static balance devices are located on the same horizontal line, the to-be-static balance detection rotor is placed on the two static balance devices, the diameter of the rotor is slightly smaller than the diameter of the bearing of the static balance device, and the axial positioning device is adjusted, so that the top cone of the axial positioning device is in contact with the center of the rotor. The medium-pressure gas is accessed, after the rotor floats, the rotor is rotated several times, and the counterweight is added, so that static balance detection of the rotor is completed.

According to the technical solution 4, static balance detection of the rotating ring-shaped parts is carried out.

Figure 51:
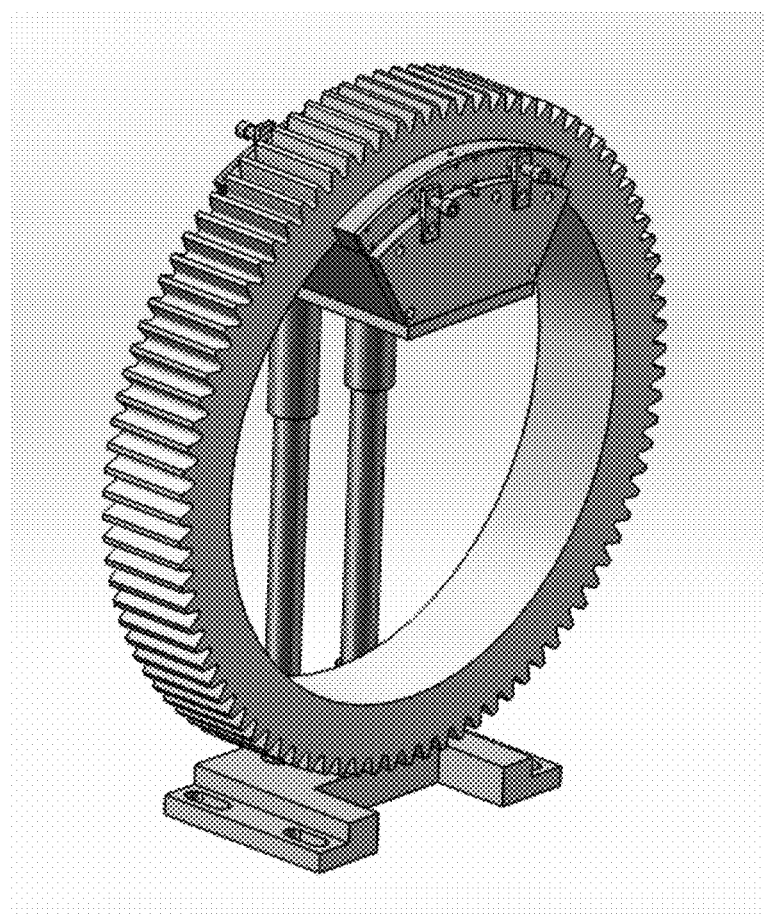
FIG. 51 is a schematic diagram of static balance of rotating ring-shaped parts (with respect to the fourth technical solution of the present disclosure).

As shown in FIG. 51, the static balance device for the rotating ring-shaped parts is installed on the workbench, the elevation is adjusted, the rotating ring-shaped parts to be subjected to static balance detection is placed on the rotating ring-shaped parts static balancing device, the curvature of the inner ring of the rotating ring-shaped part is the same as the curvature of the air flotation support structure of the rotating ring-shaped parts static balancing device, the axial positioning device is adjusted, so that the working surface of the axial positioning device and the two end faces of the rotating ring-shaped parts are reserved with small gaps, the medium-pressure gas is accessed, after the to-be-rotated ring-shaped parts floats, the rotating ring-shaped parts are rotated several times and the weight is added, so that static balance detection of the rotating ring-shaped parts is completed.

What is claimed is:

1. A split-type swing angle adjustable aerostatic bearing device for rotor static balance, comprising:
    a shaft base;
    an upper support base;
    a lower support base;
    a bottom base;
    an air inlet channel; and
    an axial positioning device;
    wherein a first semi-cylindrical surface is formed on the shaft base, the first semi-cylindrical surface is concave inwards and faces upwards, a plurality of air holes are disposed on the first semi-cylindrical surface; the shaft base is fixed on the upper support base, a sealed air cavity is disposed between the shaft base and the upper support base, the plurality of the air holes is communicated with the sealed air cavity, the sealed air cavity is connected with an external air supply device through the air inlet channel; the upper support base and the lower support base are hinged to drive an axis of the first semi-cylindrical surface to swing by a certain angle in a vertical direction, the lower support base and the bottom base are connected together;

the axial positioning device comprises a baffle plate, two guide rods, and an axial limiting shaft;

the two guide rods are slidably disposed on the shaft base, the baffle plate is fixed on the two guide rods, a bearing hole is disposed on a side, facing the shaft base, of the baffle plate; the axial limiting shaft is disposed in the bearing hole, and a conical surface is formed on the axial limiting shaft; an axis of the conical surface on the axial limiting shaft, the axis of the first semi-cylindrical surface of the shaft base, and axes of the two guide rods are parallel to each other, the conical surface on the axial limiting shaft is concentric with the first semi-cylindrical surface on the shaft base; two threaded holes are disposed on the shaft base, a top wire is disposed in each of the threaded holes, and the top wire is abutted on a respective one of the two guide rods.

2. The split-type swing angle adjustable aerostatic bearing device for rotor static balance according to claim 1, wherein three inwardly concave hemispherical surfaces are disposed on a bottom of the lower support base, three threaded holes are disposed on the bottom base with respect to positions of the three inwardly concave hemispherical surfaces, three supporting screws are respectively disposed in the three threaded holes, a nut of each of the supporting screws has an outwardly convex hemispherical surface, the outwardly convex hemispherical surface on each of the supporting screws is matched with a respective one of the inwardly concave hemispherical surfaces of the support base, and a shape formed by connection lines of any point on respective axes of the three supporting screws is a triangle.

3. The split-type swing angle adjustable aerostatic bearing device for rotor static balance according to claim 1, wherein four tension springs are disposed between the upper support base and the bottom base, each two of the tension springs form a group, and two groups of the tension springs are symmetrically disposed on two sides of the axis of the first semi-cylindrical surface.

4. The split-type swing angle adjustable aerostatic bearing device for rotor static balance according to claim 1, wherein a range of a swing angle of the upper support base and the lower support base is 2°~4°.

5. The split-type swing angle adjustable aerostatic bearing device for rotor static balance according to claim 1, wherein a second semi-cylindrical surface is further disposed on the shaft base, and the second semi-cylindrical surface is convex outwards; semicircular protrusions are respectively disposed on two ends of the second semi-cylindrical surface, the second semi-cylindrical surface and the first semi-cylindrical surface on the shaft base are concentrically disposed, a groove and two first semi-annular sealing grooves are disposed on the second semi-cylindrical surface, the two first semi-annular sealing grooves are parallelly disposed, the groove is disposed between the two first semi-annular sealing grooves, a rubber sealing strip is disposed in each of the first semi-annular sealing grooves; a third semi-cylindrical surface is disposed on the upper support base, the third semi-cylindrical surface is concave inwards, two semicircular ring grooves are disposed on one end of the third semi-cylindrical surface, the two semicircular ring grooves are parallelly disposed, each of the semicircular protrusions is matched with each of the semicircular ring grooves, the third semi-cylindrical surface is matched with the second semi-cylindrical surface to form the sealed air cavity between the groove and the first semi-cylindrical surface;

two second semi-annular sealing grooves are further disposed on the shaft base, the two second semi-annular sealing grooves are disposed on two sides of the axis of the first semi-cylindrical surface inwardly concaved; two third semi-annular sealing grooves are further disposed on the upper support base, the two third semi-annular sealing grooves are disposed on two sides of an axis of the second semi-cylindrical surface; each of the third semi-annular sealing grooves is matched with each of the second semi-annular sealing grooves to form a complete O-ring groove, an O-shaped rubber sealing ring is disposed on each of the O-ring grooves, each of the O-shaped rubber sealing rings is pressed by a pressing plate; the shaft base and the upper support base are respectively connected with the pressing plate by screws; and the screws on the shaft base penetrate through the pressing plate and are connected with the shaft base and the upper support base, so that the rubber sealing strip in each of the first semi-annular sealing grooves is tightly attached to the second semi-cylindrical surface on the upper support base.

6. The split-type swing angle adjustable aerostatic bearing device for rotor static balance according to claim 1, wherein a distribution of a plurality of the air holes is increasingly dense from two sides of the axis of the first semi-cylindrical surface to a center of the axis of the first semi-cylindrical surface.

7. A split-type swing angle adjustable aerostatic bearing device for rotor static balance, comprising:
a bearing;
a bearing base;
a sealed working air cavity;
an upper base;
a lower base; and
pillars;
wherein a first semi-cylindrical working surface is disposed on the bearing, a plurality of micro air holes, having a certain depth, are disposed on the first semi-cylindrical working surface; a second semi-cylindrical surface is disposed on the bearing, a plurality of small air holes, having a certain depth, are disposed on the second semi-cylindrical surface; the plurality of the micro air holes are communicated with the plurality of the small air holes, the bearing is fixed on the bearing base to form a sealed working air cavity between, the plurality of the small air holes are communicated with the sealed working air cavity, the sealed working air cavity is filled with medium-pressure gas through an air inlet channel, the bearing base and the upper base are in spherical contact with the two pillars, and further swing at a certain angle in a vertical direction; the upper base and the lower base are rotated by a certain angle along a circumferential direction of the upper base and the lower base through a rotating device;

the sealed working air cavity is composed of the bearing, the bearing base, a vertical pressing plate, and a transverse pressing plate; a first half O-ring groove is disposed on two sides of the bearing, a second half O-ring groove is disposed on two sides of the bearing base, a gap is disposed on the transverse pressing plate; the first half O-ring groove, the second half O-ring groove, and the gap form two O-ring grooves; an O-shaped silicone sealing ring is disposed in each of the two O-ring grooves, each of the O-ring grooves is pressed by the vertical pressing plate, the vertical pressing plate is connected to the bearing and the bearing base through a connecting piece, first half-circular sealing grooves are disposed in front and back sides of the bearing, second half-circular sealing grooves are disposed in front and rear sides of the bearing base, the first half-circular sealing grooves and the second half-circular sealing grooves form third half-circular sealing grooves, half-circular silicone gaskets of the same size are disposed on the third half-circular sealing grooves, the two ends of the half-circular silicone gasket are located directly under the O-shaped silicone gasket, each of the half-circular silicone gaskets is pressed by the transverse pressing plate, the transverse pressing plate is connected to the bearing and the bearing base through a connecting piece to form the sealed working air cavity;

at least one cylindrical protrusion is disposed on the bearing, the cylindrical protrusion is tightly attached to a third cylindrical surface of the bearing base, an axial positioning protrusion structure of the bearing is disposed on the bearing base, a positioning notch of the transverse pressing plate is disposed on the bearing, a positioning protrusion is disposed on the transverse pressing plate, and the positioning protrusion is matched with the positioning notch.

8. The split-type swing angle adjustable aerostatic bearing device for rotor static balance according to claim 7, wherein O-shaped annular protrusions matched with the O-ring grooves are disposed on a lower surface of the vertical pressing plate, a height of the O-shaped annular protrusions is smaller than a depth of the O-ring grooves, and a cut, having a certain gradient is disposed on the vertical pressing plate near the semi-cylindrical working surface to prevent collision and friction between the vertical pressing plate and a rotor.

9. The split-type swing angle adjustable aerostatic bearing device for rotor static balance according to claim 7, wherein a spherical surface is disposed on an upper end of each of the pillars, a platform is disposed on a middle part of each of the pillars; a hemispherical surface is disposed on a lower bottom surface of the bearing base, the hemispherical surface is matched with the spherical surface of each of the pillars; swing limiting cut surfaces, having a certain angle, are disposed on two sides of a bottom end of the bearing base, and the pillars are detachably connected with the upper base.

10. The split-type swing angle adjustable aerostatic bearing device for rotor static balance according to claim 7, wherein the rotating device comprises two sets of components, each of the two sets of components comprises a plurality of rolling bearing shafts and rolling bearings; a plurality of semi-cylindrical grooves are respectively disposed on two opposite ends of the lower base, the plurality of semi-cylindrical grooves are disposed in a circumferential direction along a circle, each of the rolling bearing shafts is disposed in a respective one of the semi-cylindrical grooves through the rolling bearings, a number of the plurality of rolling bearing shafts is same to a number of the semi-cylindrical grooves, the plurality of rolling bearing shafts are vertically recessed, a part of a body structure of each of the rolling bearing shafts protrudes from the lower base; a concave surface is respectively disposed on a lower part of the upper base, the concave surface is in contact with surfaces of the plurality of the rolling bearings, and the upper base is rotated by the rolling bearings disposed in a circumferential direction.

11. The split-type swing angle adjustable aerostatic bearing device for rotor static balance according to claim 10, further comprising: a rotation center positioning shaft configured to connect the upper base and the lower base; wherein a cylindrical hole is disposed in a center of the upper base, the cylindrical hole is in clearance fit with the rotation center positioning shaft; a threaded hole is disposed in a center of the lower base, and the threaded hole is threadedly connected with the rotation center positioning shaft.

12. The split-type swing angle adjustable aerostatic bearing device for rotor static balance according to claim 10, further comprising: a rotor axial positioning device; wherein the rotor axial positioning device comprises a baffle plate, two guide rods, and a positioning cone; the positioning cone is in a structure combined with a cylinder and a cone, the cone on the positioning cone is concentric with the semi-cylindrical working surface, the positioning cone is disposed on the baffle plate, the two guide rods are slidably disposed on the bearing base, and a top wire is disposed on the bearing base to fix each of the guide rods.

13. A split-type swing angle adjustable aerostatic bearing device for rotor static balance, comprising:
a bearing base;
an air flotation support cover;
an upper base;
pillars; and
a lower base;
wherein a sealed air cavity is disposed between the bearing base and a bearing disposed on the bearing base, the sealed air cavity is connected to an external air supply device through an air inlet channel on the bearing base, a plurality of air holes on the bearing is communicated with the sealed air cavity; a through hole communicated with the sealed air cavity is disposed on a bottom surface of the bearing base, the air flotation support cover is disposed under the bearing base, and an opening of the air flotation support cover is sealed to a bottom end surface of the bearing base, so that the air flotation support cover and the bearing base form a gas working air cavity; the sealed air cavity is communicated with the gas working air cavity through the through hole; a plurality of support cover air holes on the air flotation support cover is communicated with the gas working air cavity; a concave surface is disposed on the upper base, the concave surface matches an outer contour of the air flotation support cover, the concave surface is in clearance fit with an outer surface of the air flotation support cover, the air flotation support cover is disposed in the concave surface; under working conditions, after gas in the working air cavity penetrates through the plurality of the support cover air holes on the air flotation support cover, a gas mold, having a certain bearing capacity, is formed between the outer surface of the air flotation support cover and the concave surface to float the bearing base, and the bearing base freely swings to realize automatic centering of a rotor static balance device; the upper base is connected with the lower base through the pillars, and a distance between the upper base and the lower base is adjusted through the pillars to adjust an elevation of the bearing base.

14. The split-type swing angle adjustable aerostatic bearing device for rotor static balance according to claim 13, wherein a first through hole in a cylindrical shape is disposed on the bottom surface of the bearing base, a plurality of internal threaded holes are disposed around the through hole on the bottom surface of the bearing base; a plurality of second through holes in a cylindrical shape are disposed on an edge of the opening of the air flotation support cover; the air flotation support cover and the bearing base are connected to the internal threaded holes through bolts penetrating through the second through holes, sealing rings are disposed between the air flotation support cover and the bearing base; a plurality of large air holes are disposed on an inner surface of the air flotation support cover, a plurality of small air holes are further disposed on the inner surface of the air flotation support cover, and the plurality of the small air holes penetrate through the air flotation support cover to an outer surface of the air flotation support cover; the plurality of the large air holes are communicated with the plurality of the small air holes, the plurality of the large air holes are further communicated with the working air cavity;

the air flotation support cover is in a semi-annular surface shape, in a working condition, after gas in the working air cavity penetrates through the plurality of the large air holes and the plurality of the small air holes, a gas mold, having a certain bearing capacity, is formed between the outer surface of the air flotation support cover and the spherical concave surface to float the bearing base; and circular grooves are disposed on two sides of the upper base, a boss is disposed on an upper end of each of the pillars, the grooves are disposed on the respective boss to support the upper base; external threads are disposed on a lower end of each of the pillars, internal threads are disposed on two sides of the lower base, the pillars and the lower base are connected through the external treads and the internal threads, and the elevation of the bearing base is adjusted through rotating the pillars.

15. An air flotation support device for static balance of rotating ring-shaped parts, comprising:
an air flotation support structure;
an axial sealing pressing plate;
a radial sealing pressing plate;
a connecting pillar;
a base; and
two axial positioning devices;
wherein the air flotation support structure is configured to support rotating ring-shaped parts, having a size less than or equal to a semi-cylindrical structure of the rotating ring-shaped parts, an air inlet is disposed on a wall of a first end of the air flotation support structure, the air inlet is communicated with a working air cavity in the air flotation support structure, a range of an angle α between two side walls along a circumferential direction on a working surface of the air flotation support structure is 30°~180°, namely that a central angle α with respect to an arc on a cross section of the air flotation support structure is 30°~180°, a plurality of through holes communicated with the working air cavity are disposed on a curved side wall of the air flotation support structure, an open end surface of a second end of the air flotation support structure is sealed and connected through the axial sealing pressing plate, a longitudinal section end of the air flotation support structure is sealed and connected with the radial sealing pressing plate, the radial sealing pressing plate is connected with the base through the connecting pillar; the axial positioning devices are respectively disposed on the two ends of the working surface of the air flotation support structure; in a working state, a gas penetrates through the air inlet to the working air cavity in the air flotation support structure, then penetrates through a plurality of through holes and enters the working surface of the air flotation support structure, and a gas mold, having a certain bearing capacity, is formed between the gas and a cylindrical surface of the rotating ring-shaped parts to be tested for static balance, so as to float the rotating ring-shaped parts to be tested for static balance.

16. The air flotation support device for static balance of rotating ring-shaped parts according to claim 15, wherein a range of the angle α is 30°~150°.

17. The air flotation support device for static balance of rotating ring-shaped parts according to claim 16, wherein each of the axial positioning devices comprises a working air cavity and an air inlet channel, a plurality of through holes communicated with the working air cavity are disposed on a thrust working surface of each of the axial positioning devices, a positioning structure configured to prevent the axial positioning device from rotating along the air flotation support structure is disposed between each of the axial positioning devices and the air flotation support structure; in a working state, the gas enters the working air cavity through the air inlet channel of each of the axial positioning devices, then the gas enters the thrust working surface through the plurality of through holes, and a gas mold, having a certain thrust, is formed along an axial end surface of the rotating ring-shaped part to be tested for static balance, and further plays a role in axial positioning.

18. The air flotation support device for static balance of rotating ring-shaped parts according to claim 17, wherein each of the axial positioning devices comprises an axial positioning thrust plate and an axial positioning sealing pressing plate, the axial positioning thrust plate is sealed and connected the axial positioning sealing pressing plate, a thrust plate working air cavity and a thrust plate air inlet channel are disposed on the axial positioning thrust plate; and thrust plate through holes on the thrust working surface of each of the axial positioning devices are composed of small cylindrical through holes and micro cylindrical through holes communicated from the outside to the inside.

19. The air flotation support device for static balance of rotating ring-shaped parts according to claim 18, wherein the through holes communicated with the working air cavity are disposed on the air flotation support structure, the through holes are composed of small cylindrical through holes and micro-cylindrical through holes connected from the inside to the outside.

20. The air flotation support device for static balance of rotating ring-shaped parts according to claim 19, wherein the connecting pillar is in a double-threaded structure, the connecting pillar is threadedly connected with the radial sealing pressing plate and the base, and an elevation of the air flotation support device is adjusted by rotating the connecting pillar.

* * * * *